(12) United States Patent
Yang et al.

(10) Patent No.: US 11,855,734 B2
(45) Date of Patent: Dec. 26, 2023

(54) BEAM FAILURE PROCESSING METHOD AND RELATED DEVICE

(71) Applicant: VIVO MOBILE COMMUNICATION CO., LTD., Chang'an Dongguan (CN)

(72) Inventors: Yu Yang, Chang'an Dongguan (CN); Peng Sun, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 271 days.

(21) Appl. No.: 17/353,212

(22) Filed: Jun. 21, 2021

(65) Prior Publication Data

US 2021/0314051 A1    Oct. 7, 2021

Related U.S. Application Data

(63) Continuation of application No. PCT/CN2019/110762, filed on Oct. 12, 2019.

(30) Foreign Application Priority Data

Dec. 27, 2018   (CN) .......................... 201811613070.9

(51) Int. Cl.
*H04B 7/06* (2006.01)
*H04W 74/02* (2009.01)
(Continued)

(52) U.S. Cl.
CPC .......... *H04B 7/0695* (2013.01); *H04W 74/02* (2013.01); *H04W 74/0841* (2013.01); *H04W 76/19* (2018.02); *H04W 80/02* (2013.01)

(58) Field of Classification Search
CPC .... H04B 7/0695; H04B 7/088; H04B 7/0421; H04B 7/061; H04W 74/02;
(Continued)

(56) References Cited

U.S. PATENT DOCUMENTS

2017/0238221 A1*  8/2017  Santhanam ........... H04W 36/08
                                                                  370/331
2018/0323856 A1   11/2018  Xiong et al.
(Continued)

FOREIGN PATENT DOCUMENTS

CN         108093481 A      5/2018
CN         108260212 A      7/2018
(Continued)

OTHER PUBLICATIONS

Extended European search report related to Application No. 19903483.6 dated Feb. 2, 2022.
(Continued)

*Primary Examiner* — Harry H Kim
(74) *Attorney, Agent, or Firm* — von Briesen & Roper, s.c.

(57) ABSTRACT

The present disclosure provides a beam failure processing method and a related device. The method includes: determining, based on a beam failure detection reference signal BFD RS resource group, whether a beam failure occurs in a first cell group, where the BFD RS resource group is configured in a first cell group; and sending a beam failure recovery request message to a network side device in a case that a beam failure occurs in the first cell group.

17 Claims, 3 Drawing Sheets

201
Determine, based on a beam failure detection reference signal BFD RS resource group, whether a beam failure occurs in a first cell group 202
Send a beam failure recovery request message to a network side device in a case that a beam failure occurs in the first cell group

(51) Int. Cl.

| | | |
|---|---|---|
| H04W 74/08 | (2009.01) | |
| H04W 76/19 | (2018.01) | |
| H04W 80/02 | (2009.01) | |
| H04W 76/15 | (2018.01) | |
| H04B 7/08 | (2006.01) | |
| H04W 72/044 | (2023.01) | |
| H04W 74/00 | (2009.01) | |
| H04L 5/00 | (2006.01) | |
| H04W 76/18 | (2018.01) | |
| H04B 7/0417 | (2017.01) | |

(58) Field of Classification Search
 CPC . H04W 74/0841; H04W 76/19; H04W 80/02; H04W 76/15; H04W 72/046; H04W 74/004; H04W 76/18; H04L 5/001; H04L 5/0048
 See application file for complete search history.

(56) References Cited

U.S. PATENT DOCUMENTS

| | | | |
|---|---|---|---|
| 2018/0368142 A1 | 12/2018 | Liou | |
| 2019/0253941 A1* | 8/2019 | Cirik | H04W 36/0077 |
| 2020/0367308 A1 | 11/2020 | Chen et al. | |
| 2020/0413469 A1 | 12/2020 | Wu et al. | |
| 2021/0044344 A1 | 2/2021 | Jiang | |
| 2021/0167839 A1* | 6/2021 | Zhang | H04L 5/0023 |
| 2021/0281295 A1* | 9/2021 | Li | H04B 7/0626 |
| 2021/0314885 A1* | 10/2021 | Kwak | H04W 52/247 |
| 2021/0409091 A1* | 12/2021 | Svedman | H04W 72/23 |
| 2022/0039077 A1 | 2/2022 | Koskela et al. | |
| 2022/0182852 A1* | 6/2022 | Siomina | H04W 24/02 |

FOREIGN PATENT DOCUMENTS

| | | |
|---|---|---|
| CN | 108513737 A | 9/2018 |
| CN | 108809580 A | 11/2018 |
| JP | 2021521703 A | 8/2021 |
| JP | 2022501919 A | 1/2022 |
| WO | 20182311161 A1 | 12/2018 |

OTHER PUBLICATIONS

Indian Office Action related to Application No. 202127029754 dated Mar. 14, 2022.
Chinese Office Action related to Application No. 201811613070.9 dated Feb. 9, 2022.
R1-1813490, Source: Nokia, Nokia Shanghai Bell, "Enhancements on Multi-beam Operation" Document for: Discussion and Decision, Agenda item: 7.2.8.3, Release: 3GPP TSG RAN WG1 Meeting #95, Nov. 12-16, 2018, Spokane, USA.
R1-1813334, Source: NTT Docomo, Inc., "Discussion on multi-beam enhancement" Document for: Discussion and Decision, Agenda item: 7.2.8.3, Release: 3GPP TSG RAN WG1 Meeting #95, Nov. 12-16, 2018, Spokane, USA.
R1-1811408, Source: Nokia, Nokia Shanghai Bell, "Enhancements on Multi-beam Operation" Document for: Discussion and Decision, Agenda item: 7.2.8.4, Release: 3GPP TSG RAN WG1 Meeting #94-bis, Oct. 8-12, 2018, Chengdu, People's Republic of China.
R1-1807661, Source: MediaTek Inc., "Summary 1 on Remaining issues on Beam Failure Recovery" Document for: Discussion, Agenda item: 7.1.2.2.4, Release: 3GPP TSG RAN WG1 Meeting #93, May 21-25, 2018, Busan, Korea.
R1-1807180, Source: Nokia (to be RAN1), "LS Response to RAN2 Reply LS to RAN1 on beam Failure recovery" Release: 3GPP TSG-RAN WG1 Meeting #93, May 21-25, 2018, Busan, Korea.
R2-1808024, Source: Nokia, Nokia Shanghai Bell, "SCell Beam Failure Recovery" Document for: Discussion and Decision, Agenda item: 10.3.1.4.2, Release: 3GPP TSG-RAN WG2 Meeting #102, May 21-25, 2018, Busan South Korea.
International Search Report & Written Opinion related to Application No. PCT/CN2019/110762; dated Oct. 12, 2019.
First Chinese Office Action for related Application No. 201811613070.9; dated Jun. 17, 2021.
Nokia, Nokia Shanghai Bell, "Remaining Details on Beam Recovery", May 21-25, 2018, 3GPP TSG-RAN WG1 Meeting#93, Busan, Korea.
Huawei, Hisilicon, "non-contention based random access for beam failure recovery in CA", Jan. 22-26, 2018, 3GPP TSG-RAN WG2#AH-1801, Vancouver, Canada.
First Japanese Office Action related to Application No. 2021-537881 dated Jul. 12, 2022.
R1-1800101, Source: Huawei, HISilicon "Summary of remaining issues on beam failure recovery", Agenda Item: 7.2.2.4, Document for: Discussion and decision, 3GPP TSG RAN WG1 Ad Hoc Meeting, Vancouver, Canada, Jan. 22-26, 2018.

* cited by examiner

BEAM FAILURE PROCESSING METHOD AND RELATED DEVICE

CROSS-REFERENCE TO RELATED APPLICATIONS

This application is a continuation application of PCT Application No. PCT/CN2019/110762 filed on Oct. 12, 2019, which claims priority to Chinese Patent Application No. 201811613070.9, filed on Dec. 27, 2018 in China, disclosures of which are incorporated herein by reference in their entireties.

TECHNICAL FIELD

The present disclosure relates to the field of communications technologies, and in particular, to a beam failure processing method and a related device.

BACKGROUND

With development of wireless communications technologies, high-frequency communication can provide a wider system bandwidth. In comparison with a low frequency band, more antenna elements can be disposed on antenna panels of a same size, thereby facilitating massive antenna deployment in a base station and a terminal (User Equipment, UE). In addition, a beam with a stronger directivity and a narrower lobe can be formed by using a beamforming technology, thereby improving a coverage area and a capacity of a system. Therefore, combining the beamforming technology with high-frequency communication and a massive antenna technology has become a development trend of a wireless communications system.

However, a multi-carrier system is introduced into the wireless communications system because the multi-carrier system can meet a requirement for a larger bandwidth. A serving cell in a typical multi-carrier system (for example, a carrier aggregation scenario) includes one primary serving cell (PCell) and at least one secondary serving cell (SCell), and both the PCell and each SCell may serve the terminal, so that the terminal can simultaneously have a plurality of serving cells.

In a millimeter wave system, a beam failure between a terminal and a network side device may occur due to influence of factors such as a sudden fluctuation of a channel, an accidental obstacle or interruption, and a rotation of the terminal. Therefore, communication performance of the terminal is relatively low.

SUMMARY

Embodiments of the present disclosure provide a beam failure processing method, a terminal, and a network side device.

According to a first aspect, an embodiment of the present disclosure provides a beam failure processing method, applied to a terminal and including:
   determining, based on a beam failure detection reference signal BFD RS resource group, whether a beam failure occurs in a first cell group, where the BFD RS resource group is configured in the first cell group; and
   sending a beam failure recovery request message to a network side device in a case that a beam failure occurs in the first cell group.

According to a second aspect, an embodiment of the present disclosure provides a beam failure processing method, applied to a network side device and including:
   receiving a beam failure recovery request message sent by a terminal, where
   the beam failure recovery request message is a message sent in a case that the terminal determines, based on a BFD RS resource group, that a beam failure occurs in a first cell group, and the BFD RS resource group is configured in the first cell group.

According to a third aspect, an embodiment of the present disclosure further provides a terminal, including:
   a determining module, configured to determine, based on a beam failure detection reference signal BFD RS resource group, whether a beam failure occurs in a first cell group, where the BFD RS resource group is configured in the first cell group; and
   a sending module, configured to send a beam failure recovery request message to a network side device in a case that a beam failure occurs in the first cell group.

According to a fourth aspect, an embodiment of the present disclosure provides a network side device, including:
   a receiving module, configured to receive a beam failure recovery request message sent by a terminal, where
   the beam failure recovery request message is a message sent in a case that the terminal determines, based on a BFD RS resource group, that a beam failure occurs in a first cell group, and the BFD RS resource group is configured in the first cell group.

According to a fifth aspect, an embodiment of the present disclosure further provides a terminal. The terminal includes a processor, a memory, and a computer program that is stored in the memory and that can run on the processor, and when the processor executes the computer program, the steps in the beam failure processing method in the first aspect are implemented.

According to a sixth aspect, an embodiment of the present disclosure further provides a network side device. The network side device includes a processor, a memory, and a computer program that is stored in the memory and that can run on the processor, and when the processor executes the computer program, the steps in the beam failure processing method in the second aspect are implemented.

According to a seventh aspect, an embodiment of the present disclosure further provides a computer-readable storage medium. The computer-readable storage medium stores a computer program, and when a processor executes the computer program, the steps in the beam failure processing method in the first aspect are implemented, or the steps in the beam failure processing method in the second aspect are implemented.

BRIEF DESCRIPTION OF DRAWINGS

To describe the technical solutions in the embodiments of the present disclosure more clearly, the following briefly describes the accompanying drawings required in the embodiments of the present disclosure. Apparently, the accompanying drawings in the following descriptions show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

Figure 1:
FIG. 1 is a structural diagram of a network system applicable to an embodiment of the present disclosure.

Referring to FIG. 1, FIG. 1 is a schematic structural diagram of a network to which an embodiment of the present disclosure can be applied. As shown in FIG. 1, the network includes a terminal (User Equipment, UE) 11 and a network side device 12, where the terminal 11 may be a terminal side device such as a mobile phone, a tablet personal computer, a laptop computer, a personal digital assistant (PDA), a mobile Internet device (MID), or a wearable device. It should be noted that a specific type of the terminal 11 is not limited in this embodiment of the present disclosure. The network side device 12 may be a macro base station, an LTE eNB, a 5G NR NB, or the like. The network side device 12 may be alternatively a small cell, for example, a low power node (LPN) pico or a femto, or the network side device 12 may be an access point (AP). The base station may be alternatively a network node formed by a central unit (CU) and a plurality of transmission reception points (TRP) that are managed and controlled by the CU. It should be noted that a specific type of the network side device 12 is not limited in the embodiments of the present disclosure.

It should be noted that a beam failure processing method in the embodiment of the present disclosure is applied to a multi-carrier system. In a typical multi-carrier system (for example, a carrier aggregation scenario), the terminal 11 may be connected to a plurality of cells, that is, the plurality of cells simultaneously serve the terminal, and the plurality of cells usually include a primary cell (PCell) and at least one secondary cell (SCell).

The following describes the beam failure processing method in the embodiments of the present disclosure.

Figure 2:
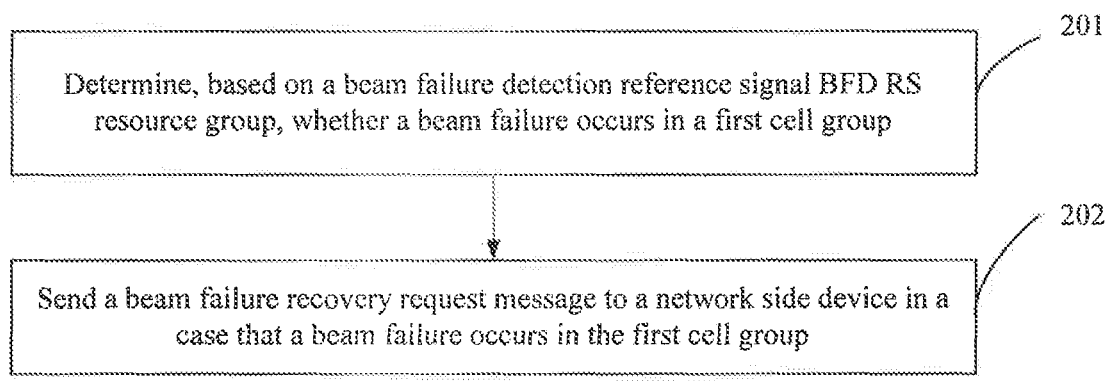
FIG. 2 is a schematic flowchart 1 of a beam failure processing method according to an embodiment of the present disclosure.

Referring to FIG. 2, FIG. 2 is a flowchart of a beam failure processing method according to an embodiment of the present disclosure. The method is applied to a terminal. As shown in FIG. 2, the method includes the following steps.

Step 201: Determine, based on a beam failure detection reference signal (BFD RS) resource group, whether a beam failure occurs in a first cell group, where the BFD RS resource group is configured in the first cell group.

In this embodiment of the present disclosure, the first cell group may be agreed upon in a protocol or configured by a network side device, including a cell group of at least one cell in cells connected to the terminal, and that the BFD RS resource group is configured in the first cell group means that the BFD RS resource group is configured in some or all cells in the first cell group including the at least one cell.

The first cell group may include only one cell, for example, the first cell group includes a primary cell or one secondary cell; or the first cell group may include a plurality of cells that meet a preset condition, for example, a plurality of cells in a same frequency band are located in the first cell group.

Optionally, the first cell group includes:

some or all secondary cells in a same frequency band; or a primary cell and at least one secondary cell in a same frequency band.

Herein, because spatial characteristics of beams in cells in a same frequency band are similar or the same, for example, at least one of spatial information, a spatial parameter, or quasi co-location (QCL) information is similar or the same. The cells in the same frequency band are agreed upon in advance or configured in a same cell group, so that a correlation between cells in a same cell group is relatively high.

In addition, in a plurality of cells connected to the terminal, one or more cell groups may be agreed upon in the protocol or preconfigured. In a case that one cell group is agreed upon in the protocol or preconfigured, the cell group is the first cell group, and other cells outside the first cell group are not grouped. Alternatively, a plurality of cell groups may be configured, each cell connected to the terminal is agreed upon in the protocol or is preconfigured a corresponding cell group, and the first cell group may be any cell group in the plurality of cell groups.

For example, in a case that the plurality of cells connected to the terminal include a PCell, an SCell 1, an SCell 2, an SCell 3, and an SCell 4, the PCell and the SCell 1 are in a same frequency band, and the SCell 2, the SCell 3, and the SCell 4 are in a same frequency band, the PCell and the SCell 1 may be preconfigured in a cell group 1, and the SCell 2, the SCell 3, and the SCell 4 may be preconfigured in a cell group 2.

It should be noted that, in one or more cell groups in the cells connected to the terminal, a corresponding group of BFD RS resources is configured in each cell group. The first cell group may be any cell group in the foregoing one or more cell groups. For ease of differentiation herein, the BFD RS resource group in this embodiment of the present disclosure is configured in the first cell group, and a BFD RS resource group configured in a cell group other than the first cell group is referred to as another BFD RS resource group.

That the BFD RS resource group is configured in the first cell group may include but is not limited to any one of the following:

in a case that the first cell group includes only one cell (for example, a primary cell or one secondary cell), the BFD RS resource group is configured in the cell; or in a case that the first cell group includes a plurality of cells, the BFD RS resource group serves as a common RS resource of the plurality of cells, and the BFD RS resource group is configured in some or all cells in the plurality of cells, thereby reducing resource overheads.

Optionally, the BFD RS resource group is configured in N preset cells in the first cell group, and N is a positive integer, where
- the N preset cells are some cells in the first cell group, and each preset cell is a cell with a preset cell index; or
- the N preset cells are all cells in the first cell group; or
- the N preset cells are primary cells in a case that the first cell group includes the primary cells.

Herein, the BFD RS resource group may be configured in some or all cells in the first cell group. Alternatively, in a case that the first cell group includes the primary cell, the BFD RS resource group is configured in the primary cell, so that a manner of configuring the BFD RS resource group in each cell group is flexible.

In this embodiment of the present disclosure, the BFD RS resource group may be configured in the first cell group by the network side device. Optionally, before step 101, the method further includes: receiving first configuration information sent by the network side device, where the first configuration information is used to configure the BFD RS resource group in the first cell group, to accurately configure the BFD RS resource group for each cell group based on an actual requirement.

The first configuration information may be any information that can be used to configure the BFD RS resource group in the first cell group. For example, the first configuration information may include information about an association relationship between the BFD RS resource group and the first cell group. Certainly, the first configuration information may further include information used to configure another BFD RS resource group in a corresponding cell group. This is not limited herein.

In addition, to configure the BFD RS resource group in some cells in the first cell group, that is, configure the BFD RS resource group in N preset cells that have a preset cell index, optionally, the first configuration information includes a preset cell index of a cell in which the BFD RS resource group is located, so that a manner of allocating the BFD RS resource group in some cells in the first cell group is simple, and resource overheads are reduced.

For example, in a case that the first cell group includes the SCell 2, the SCell 3, and the SCell 4, and cell indexes of the SCell 3 and the SCell 4 are preset cell indexes, if the BFD RS resource group needs to be configured in the SCell 3 and the SCell 4, the first configuration information includes the cell indexes of the SCell 3 and the SCell 4.

It should be noted that the receiving first configuration information sent by the network side device may be receiving the first configuration information sent by the network side device by using radio resource control (RRC). Alternatively, the first configuration information may be sent by the network side device by using another resource or signaling. This is not limited herein.

In this embodiment of the present disclosure, the determining, based on a BFD RS resource group, whether a beam failure occurs in a first cell group in step 201 may be: detecting, by the terminal, whether a beam failure occurs in some or all cells configured with the BFD RS resource group, for example, measuring signal transmission quality based on a BFD RS resource of a beam of each cell, and if the signal transmission quality is less than a preset threshold, determining that a beam failure occurs in the cell; and determining, based on whether a beam failure occurs in some or all cells, whether a beam failure occurs in the first cell group.

It should be noted that the BFD RS resource group includes at least one BFD RS resource, and that the BFD RS resource group is configured in the first cell group may be understood as that the at least one BFD RS resource is configured in some or all cells in the first cell group.

For example, in a case that the first cell group includes the cell group 1 of the PCell and the SCell 1, if the BFD RS resource group includes a BFD RS resource 1, a BFD RS resource 2, and a BFD RS resource 3, the BFD RS resource 1, the BFD RS resource 2, and the BFD RS resource 3 may be configured in at least one of the PCell and the SCell. For example, the BFD RS resource 1 is configured in the PCell, and the BFD RS resource 2 and the BFD RS resource 3 are configured in the SCell 1, or the BFD RS resource 1, the BFD RS resource 2, and the BFD RS resource 3 are configured in the SCell 1.

Certainly, the detecting, by the terminal, whether a beam failure occurs in some or all cells configured with the BFD RS resource group may be understood as measuring, by the terminal, a BFD RS resource of each cell configured with the BFD RS resource in the first cell group, to determine whether a beam failure occurs in each cell configured with the BFD RS resource.

In addition, in the foregoing BFD RS resource group, a plurality of BFD RS resources may be simultaneously configured in one cell, and different BFD RS resources are used to measure different beams in the cell. In this case, the detecting whether a beam failure occurs in the cell may be determining, in a case that it is detected that some or all beams corresponding to the BFD RS resource in the cell fail, that a beam failure occurs in the cell.

In a specific embodiment of the present disclosure, because the BFD RS resource group may be configured in N preset cells in the first cell group, and when N=1, that is, the BFD RS resource group is configured in one preset cell (for example, the PCell), if a beam failure occurs in the preset cell, it is determined that a beam failure occurs in the first cell group.

Alternatively, the BFD RS resource group may be configured in a plurality of preset cells, that is, optionally, in a case that N preset cells are the foregoing partial cells or all the foregoing cells, and N is greater than 1, the determining whether a beam failure occurs in the first cell group includes:
- in a case that a beam failure occurs in all cells in the N preset cells, determining that a beam failure occurs in the first cell group; or
- in a case that a beam failure occurs in a first quantity of cells in the N preset cells, determining that a beam failure occurs in the first cell group.

Herein, in a case that a beam failure occurs in all cells in the N preset cells or in the first quantity of cells, it may be determined that a beam failure occurs in the first cell group, so that a manner of determining whether a beam failure occurs in the first cell group is more flexible.

A plurality of cells in a same cell group are generally associated with each other, for example, in a case that the first cell group includes a plurality of cells in a same frequency band, spatial characteristics of beams in the plurality of cells in the first cell group are the same or similar. Therefore, when a beam failure occurs in any cell in the plurality of cells in the same cell group, a possibility that a beam failure occurs in another cell in the cell group is relatively high, and in a case that a beam failure occurs in the first quantity of cells in the N preset cells, it may be determined that a beam failure occurs in the first cell group.

In addition, the first quantity may be a quantity agreed upon in the protocol, configured by the network side device, or preset by the terminal, and the first quantity may be one or another quantity less than N. This is not limited herein.

Step 202: Send a beam failure recovery request message to a network side device in a case that a beam failure occurs in the first cell group.

In a case that it is determined that a beam failure occurs in the first cell group in step 201, the terminal may send the beam failure recovery request message to the network side device, to notify the network side device that a beam failure occurs in the first cell group.

In addition, in a case that a beam failure occurs in the first cell group, an alternative beam may be searched between the terminal and the network side device, and data is transmitted and received by using the alternative beam instead of a faulty beam in the first cell group, thereby implementing fault recovery. Certainly, the alternative beam may also be agreed upon in the protocol or configured by the network side device. This is not limited herein.

Alternatively, the terminal may determine information about the alternative beam by using the following implementation 1, so that the network side device determines the alternative beam by using the information about the alternative beam. Details are as follows Implementation 1

In this implementation, before the sending a beam failure recovery request message to a network side device, the method further includes: determining the information about the alternative beam The foregoing manner of determining the information about the alternative beam may include but is not limited to the following manner 1 and manner 2:

Manner 1

In manner 1, the network side device configures, for the terminal, an RS resource set used to perform beam training, and the terminal measures each RS resource in the RS resource set to determine an RS resource that meets a preset condition in the RS resource set. For example, if an L1-RSRP of an RS resource is higher than a threshold, it is determined that the RS resource meets the preset condition.

In addition, the terminal reports information about the determined at least one RS resource that meets the preset condition to the network side device. A reporting manner may include: adding the information to the beam failure recovery request message to be sent to the network side device, or adding the information to a beam report to be sent to the network side device. The network side device determines the alternative beam based on the information about the at least one RS resource reported by the terminal, and the determined alternative beam is also a candidate beam.

It should be noted that information about each RS resource may include at least one of an RS resource index, a layer 1 reference signal received power (L1-RSRP), and a layer 1 signal to interference plus noise ratio (L1-SINR).

Manner 2

In manner 2, before the sending a beam failure recovery request message to a network side device, the method further includes: determining a target candidate beam RS resource based on a candidate beam RS resource group, where
the beam failure recovery request message is used to indicate information about the target candidate beam RS resource, and the candidate beam RS resource group is configured in a second cell group.

Herein, the terminal may determine the target candidate beam RS resource based on the candidate beam RS resource group, and the beam failure recovery request message is used to indicate the information about the target candidate beam RS resource, so that the terminal can directly determine a candidate beam based on the information about the target candidate beam RS resource, thereby improving efficiency of determining the alternative beam.

In manner 2, the candidate beam RS resource group may be configured in the terminal by the network side device. Optionally, before step 203, the method includes:
receiving second configuration information sent by the network side device, where the second configuration information is used to configure the candidate beam RS resource group in the second cell group.

Herein, the network side device may configure the candidate beam RS resource group in the second cell group by using the second configuration information, so that a candidate beam RS resource group is accurately configured for each cell group based on an actual requirement.

It should be noted that the second cell group and the first cell group may be a same cell group, or the second cell group and the first cell group may be different cell groups. For example, the first cell group includes the PCell and the SCell 1, and the second cell group includes the SCell 2, the SCell 3, and the SCell 4, or some cells in the second cell group and the first cell group are the same.

In manner 2, that the candidate beam RS resource group is configured in the second cell group may be that and the candidate beam RS resource group is configured in some or all cells in the second cell group.

Optionally, the candidate beam RS resource group is configured in M preset cells in the second cell group, and M is a positive integer, where
the M preset cells are some cells in the second cell group, and each preset cell is a cell with a preset cell index; or
the M preset cells are all cells in the second cell group; or
the M preset cells are primary cells in a case that the second cell group includes the primary cells.

An implementation principle in which the candidate beam RS resource group is configured in the second cell group may be similar to an implementation principle in which the BFD RS resource group is configured in the first cell group. Details are not described herein again.

It should be noted that the second cell group includes at least one cell, and the candidate beam RS resource group includes at least one candidate beam RS resource. That the candidate beam RS resource group is configured in the second cell group may be that the at least one candidate beam RS resource is configured in some or all cells in the at least one cell.

In addition, the information about the target candidate beam RS resource may include at least one of the following:
an index of the target candidate beam RS resource;
an L1-RSRP of the target candidate beam RS resource; and
an L1-SINR of the target candidate beam RS resource, and the like.

In this embodiment of the present disclosure, the sending, by the terminal, a beam failure recovery request message to a network side device may be sending the beam failure recovery request message to the network side device in the first cell group or the second cell group, or may be sending the beam failure recovery request message to the network side device in a cell group or a cell other than the first cell group or the second cell group.

In specific implementation, the terminal may send the beam failure recovery request message to the network side device by using at least one of the following implementation manners 2 to 4:

Implementation 2

In this implementation, the sending a beam failure recovery request message to a network side device includes:

sending the beam failure recovery request message to the network side device in a first cell, where the first cell is a cell connected to the terminal.

Herein, in a case that the beam failure recovery request message is sent to the network side device in the first cell, first cell determining manners corresponding to different scenarios may be preconfigured for the terminal, so that in different scenarios, the terminal can determine the first cell based on a first cell determining manner corresponding to a current scenario.

Optionally, the first cell may be a first cell that is determined based on a first cell determining manner corresponding to a comparison result of comparing whether a PCell and an SCell connected to the terminal are in a same frequency band. The following manner 1 and manner 2 may be included Manner 1

In manner 1, the PCell and the SCell are in a same frequency band, and the first cell may include any one of the following the PCell;

a preset cell in the first cell group or the second cell group, for example, a cell with a preset cell index in the first cell group or the second cell group, where the second cell group is a cell group in which a candidate beam RS resource group is configured;

a secondary cell outside the first cell group or the second cell group in cells connected to the terminal; and a preset cell in a third cell group, and the like.

In manner 1, the first cell may be any secondary cell outside the first cell group or the second cell group. Optionally, in a case that the first cell is a secondary cell outside the first cell group or the second cell group in cells connected to the terminal, the first cell may meet at least one of the following:

being a secondary cell associated with the first cell group or the second cell group; or being a secondary cell indicated by a network side; or being a secondary cell selected from a plurality of secondary cells configured by a network side; or being a secondary cell in a same frequency band with the first cell group or the second cell group.

Certainly, the first cell may be alternatively a secondary cell in a different frequency band from the first cell group or the second cell group.

It should be noted that the second cell group in manner 1 and the second cell group in the foregoing implementation 1 are a same cell group.

In addition, the third cell group may be a same cell group as the first cell group and the second cell group. Alternatively, the third cell group may be a different cell group from the first cell group and the second cell group. Alternatively, some cells in the third cell group are the same as those in the first cell group and the second cell group.

Manner 2

The PCell and the SCell are in different frequency bands. Optionally, the PCell is in a first frequency range and the SCell is in a second frequency range, or the PCell and the SCell are in different frequency bands in a second frequency range. The first frequency range is less than the second frequency range (for example, the first frequency range is an FR1, and the second frequency range is an FR2). The first cell may include but is not limited to any one of the following:

the PCell, for example, the first cell is the PCell in a case that the PCell is in the FR1 and the PCell is in the FR2, or regardless of whether the PCell is in the FR1 or the FR2;

a cell in a same frequency band with the first cell group or the second cell group, where the second cell group is a cell group configured with a candidate beam RS resource group;

a secondary cell in a frequency band in the second frequency range other than a frequency band in which the first cell group or the second cell group is located; and a preset cell in a fourth cell group.

In manner 2, in a case that the first cell is a cell in a same frequency band as the first cell group or the second cell group, the first cell may include any one of the following:

one of secondary cells in which a beam failure occurs in the first cell group, for example, may be any secondary cell that meets a preset condition (for example, a secondary cell with a preset cell index) in secondary cells in which a beam failure occurs in the first cell group; and a secondary cell different from a cell in which a beam failure occurs in the first cell group, for example, a secondary cell that meets a preset condition, a secondary cell associated with the first cell group, a secondary cell indicated by the network side device, or a secondary cell selected by the terminal from a plurality of secondary cells configured by the network side device. Certainly, the secondary cell may be a cell in the first cell group or a cell outside the first cell group, including:

one of secondary cells configured with candidate beam RS resources in the second cell group, for example, may be any secondary cell that meets a preset condition (for example, a secondary cell with a preset cell index) in secondary cells configured with candidate beam RS resources in the second cell group; and a secondary cell different from a cell configured with a candidate beam RS resource in the second cell group, for example, a secondary cell that meets a preset condition, a secondary cell associated with the second cell group, a secondary cell indicated by the network side device, or a secondary cell selected by the terminal from a plurality of secondary cells configured by the network side device. The secondary cell may be a cell in the second cell group or a cell outside the second cell group, or the like.

In addition, in a case that the first cell is a secondary cell in a frequency band other than a frequency band in which the first cell group or the second cell group is located in the second frequency range, the secondary cell may be a cell that meets the preset condition, for example, a secondary cell associated with the first cell group or the second cell group, a secondary cell indicated by the network side device, or a secondary cell selected by the terminal from the plurality of secondary cells configured by the network side device.

It should be noted that the second cell group in manner 2 and the second cell group in the foregoing implementation 1 are a same cell group.

In addition, the fourth cell group may be a same cell group as the first cell group and the second cell group in implementation 1. Alternatively, the fourth cell group may be a different cell group from the first cell group and the second cell group. Alternatively, some cells in the fourth cell group are the same as those in the first cell group and the second cell group.

Implementation 3

In this implementation, the sending a beam failure recovery request message to a network side device includes: sending the beam failure recovery request message to the network side device in a second cell in a first manner, where the second cell is a cell connected to the terminal, so that a manner of sending the failure recovery request message in the second cell can be configured as required.

The second cell may be any cell that can send the beam failure recovery request message. For example, the second cell may be the first cell in the foregoing implementation 2.

In addition, the first manner may be any manner in which the beam failure recovery request message can be sent in the second cell. Optionally, the first manner includes any one of the following:
  sending the beam failure recovery request message on a physical random access channel (PRACH) resource;
  sending the beam failure recovery request message on a physical uplink control channel (PUCCH) resource; and
  sending the beam failure recovery request message on a Medium Access Control (MAC) control element (CE).

Herein, the terminal may send the beam failure recovery request message on the PRACH resource, the PUCCH resource, or the MAC CE, so that a manner in which the terminal sends the beam failure recovery request message on the cell is flexible.

It should be noted that, to enable the terminal to send the beam failure recovery request message in the first manner, the terminal needs to configure a channel resource of the first manner in the second cell. Optionally, before the sending the beam failure recovery request message to the network side device in a second cell in a first manner, the method further includes:
  receiving third configuration information sent by the network side device, where the third configuration information is used to configure a channel resource used in the first manner for the terminal in the second cell.

For example, in a case that the first manner is sending the beam failure recovery request message on the PRACH resource, the third configuration information is used to configure the PRACH resource for the terminal in the second cell; or in a case that the first manner is sending the beam failure recovery request message on the PUCCH resource, the third configuration information is used to configure the PUCCH resource for the terminal in the second cell; or in a case that the first manner is sending the beam failure recovery request message on the MAC CE, the third configuration information is used to configure, for the terminal in the second cell, a physical channel resource on which the MAC CE is located.

In this implementation, the terminal may send the beam failure recovery request message in the second cell by using the PRACH resource, and the PRACH resource may be at least one of a contention-free PRACH resource and a contention PRACH resource. Therefore, the terminal may send the beam failure recovery request message by using the contention-free PRACH resource or the contention PRACH resource.

Optionally, in a case that the first manner is sending the beam failure recovery request message on the PRACH resource, the PRACH resource is a contention-free PRACH resource and/or a contention PRACH resource; and
  the sending the beam failure recovery request message to the network side device in a second cell in a first manner includes:
    sending the beam failure recovery request message on the contention-free PRACH resource; or
    in a case that the beam failure recovery request message fails to be sent on the contention-free PRACH resource, sending the beam failure recovery request message on the contention PRACH resource; or
    in a case that a target candidate beam RS resource is not determined, sending the beam failure recovery request message on the contention PRACH resource; or
    in a case that the PRACH resource is only a contention PRACH resource, sending the beam failure recovery request message on the contention PRACH resource.

Herein, the terminal may send the beam failure recovery request message by using the contention-free PRACH resource or the contention PRACH resource in different scenarios, so that a manner of sending the beam failure recovery request message by using the PRACH resource is flexible.

It can be learned from the foregoing implementation 1 that the beam failure recovery request message may be used to indicate the information about the target candidate beam RS resource, and in a case that the beam failure recovery request message is sent by using the contention-free PRACH resource or the contention PRACH resource, the beam failure recovery request message may carry the information about the target candidate beam RS resource.

Alternatively, optionally, there is an association relationship between the contention-free PRACH resource and the target candidate beam RS resource, so that in a case that the beam failure recovery request message is sent by using the contention-free PRACH resource, the network side device can obtain the target candidate beam RS resource by using the association relationship between the contention-free PRACH resource and the target candidate beam RS resource, thereby saving resource overheads.

It should be noted that the PRACH resource may be configured in a frequency band in which the first cell group is located, or may be configured in a frequency band other than the frequency band in which the first cell group is located. Optionally, in a case that a primary cell and a secondary cell that are connected to the terminal are in different frequency bands, the PRACH resource may be a PRACH resource configured in a frequency band in which the first cell group is located.

In addition, in a case that the first manner is sending the beam failure recovery request message on the PUCCH resource, the PUCCH resource may be configured in the PCell or the SCell. Optionally, in a case that the primary cell and the secondary cell that are connected to the terminal are in different frequency bands, and the first manner is sending the beam failure recovery request message on the physical uplink control channel PUCCH resource, the third configuration information is used to configure the PUCCH resource in the primary cell. That is, in this case, only the PUCCH resource is configured in the PCell, but the PUCCH resource is not configured in the SCell.

Certainly, in a case that the beam failure recovery request message may be used to indicate the information about the target candidate beam RS resource, when the beam failure recovery request message is sent by using the MAC-CE or the PUCCH resource, the beam failure recovery request message may carry the information used to indicate the candidate beam RS resource.

Optionally, in a case that in the first manner is sending the beam failure recovery request message on the PUCCH resource or sending the beam failure recovery request message on the MAC CE, the beam failure recovery request message carries first information and/or second information, the first information is used to indicate that a beam failure occurs in the first cell group, and the second information is used to indicate information about a candidate beam.

The second information may be any information that can be used by the network side device to determine a candidate beam, and may include information about at least one RS resource, so that the network side device determines the candidate beam based on the information about the at least one RS resource; or may include only information about a target candidate beam RS resource, so that the network side device can directly determine the candidate beam based on the information about the target candidate beam RS resource. Optionally, the information about the candidate beam may include the information about the target candidate beam RS resource.

In addition, the information about the target candidate beam RS resource may be obtained in manner 2 in the foregoing implementation 1, or may be obtained in another manner. This is not limited herein.

In this implementation, the second information may include at least one of the following
- an index of the target candidate beam RS resource;
- an L1-RSRP of the target candidate beam RS resource; and
- an L1-SINR of the target candidate beam RS resource, and the like.

It should be noted that, in a case that the terminal sends the beam failure recovery request message in the first manner, the network side device may also receive the beam failure recovery request message in the second manner corresponding to the first manner. For example, in a case that the first manner is sending the beam failure recovery request message on the PRACH resource, the second manner is receiving the beam failure recovery request message on the PRACH resource; or in a case that the first manner is sending the beam failure recovery request message on the PUCCH resource, the second manner receiving the beam failure recovery request message on the PUCCH resource; or in a case that the first manner is sending the beam failure recovery request message on the MAC CE, the second manner is receiving the beam failure recovery request message on the MAC CE.

Implementation 4

In this implementation, the sending a beam failure recovery request message to a network side device includes:
sending the beam failure recovery request message to the network side device on a target uplink beam, where the target uplink beam is at least one uplink beam in a third cell, and the third cell is a cell connected to the terminal Herein, the terminal may send the beam failure recovery request message to the network side device on the target uplink beam, so that a manner in which the terminal sends the beam failure recovery request message is more flexible.

The target uplink beam may be an uplink beam preset by the terminal, agreed upon in the protocol, or configured on the network side; or may be an uplink beam determined by the terminal.

Optionally, before the sending the beam failure recovery request message to the network side device on a target uplink beam, the method further includes:
determining the target uplink beam based on a preset uplink beam, where the preset uplink beam includes at least one of the following:
a beam of an uplink channel and/or an uplink reference signal last sent by the terminal;
a beam of a PUCCH last sent by the terminal; and
a beam of a preset PUCCH in a preset cell and/or a preset bandwidth part BWP, and the preset PUCCH has a preset PUCCH resource index.

Herein, the terminal may determine the target uplink beam based on the preset uplink beam, so that communication performance can be improved.

The beam of the uplink channel and/or the uplink reference signal sent last may be a beam of an uplink channel and/or an uplink reference signal sent last in the third cell, the first cell, the second cell, a cell in the first cell group, a cell in the second cell group, a cell in the third cell group, a cell in the fourth cell group, or a predefined cell. Similarly, the beam of the PUCCH sent last may also be a beam of a PUCCH sent last in the third cell, the first cell, the second cell, a cell in the first cell group, a cell in the second cell group, a cell in the third cell group, a cell in the fourth cell group, or a predefined cell.

In addition, the preset cell may be a cell with a preset cell index, for example, the preset cell index is a minimum cell index or a maximum cell index. The preset BWP may be a BWP with a preset BWP index, for example, the preset BWP index is a minimum BWP index or a maximum BWP index. The preset PUCCH resource index may be a minimum PUCCH resource index, a maximum PUCCH resource index, or the like. This is not limited herein.

In this implementation, the determining the target uplink beam based on a preset uplink beam may be determining a beam near a direction of the preset uplink beam (for example, an included angle between a transmit direction and a transmit direction of the preset uplink beam is less than an angle value) as the target uplink beam.

It should be noted that the third cell may be any cell that can send the beam failure recovery request message. For example, the third cell may be the first cell in the foregoing implementation 2.

In this embodiment of the present disclosure, after the network side device receives the beam failure request message, the network side device may send a beam failure recovery request response message to the terminal. Optionally, after the sending a beam failure recovery request message to a network side device, the method includes:
receiving a beam failure recovery request response message sent by the network side device, so that the terminal can update a faulty beam based on the beam failure recovery request response message in a timely manner, that is, switch to an alternative beam for data transmission, thereby implementing fault recovery.

The receiving a beam failure recovery request response message sent by the network side device may be receiving, in a cell in the first cell group, the beam failure recovery request response (for example, a gNB response) message sent by the network side device, or receiving, in a cell outside the first cell group, the beam failure recovery request response message sent by the network side device. This is not limited herein.

Optionally, the receiving a beam failure recovery request response message sent by the network side device includes:

receiving, in a fourth cell, the beam failure recovery request response message sent by the network side device, where the fourth cell includes any one of the following:
a primary cell connected to the terminal; or
a secondary cell in the first cell group, a second cell group, a third cell group, or a fourth cell group; and
a secondary cell outside the first cell group, the second cell group, the third cell group, or the fourth cell group in cells connected to the terminal; or
a preset cell in a fifth cell group, where
the second cell group is configured with a candidate beam RS resource group; the third cell group is a cell group in which a first cell is located in a case that a primary cell and a secondary cell that are connected to the terminal are in a same frequency band, and the first cell is a cell used to send the beam failure recovery request message; and the fourth cell group is a cell group in which the first cell is located in a case that the primary cell and the secondary cell are in different frequency bands.

It should be noted that the second cell group is the second cell group in the foregoing implementation 1, the third cell group is the third cell group in the foregoing implementation 2, and the fourth cell group is the fourth cell group in the foregoing implementation 2.

The fifth cell group may be a cell group that is the same as the first cell group, the second cell group, the third cell group, or the fourth cell group, or the fifth cell group may be a cell group that is different from the first cell group, the second cell group, the third cell group, or the fourth cell group. Alternatively, some cells in the fifth cell group are the same as those in the first cell group, the second cell group, the third cell group, or the fourth cell group. This is not limited herein.

It should be noted that the plurality of optional implementations described in this embodiment of the present disclosure may be implemented in combination with each other, or may be separately implemented. This is not limited in this embodiment of the present disclosure.

In this embodiment of the present disclosure, it is determined, based on a beam failure detection reference signal BFD RS resource group, whether a beam failure occurs in a first cell group, where the BFD RS resource group is configured in a first cell group; and a beam failure recovery request message is sent to a network side device in a case that a beam failure occurs in the first cell group. In this way, in a multi-carrier system, if a beam failure occurs in the first cell group, a terminal can send the beam failure recovery request message to the network side device in a timely manner, thereby improving communication performance of the terminal, and reducing RS configuration resource overheads and resource overheads of transmitting the beam failure recovery request message.

Figure 3:
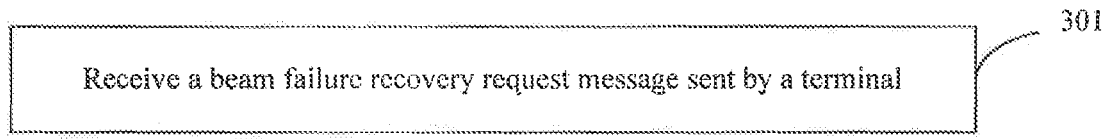
FIG. 3 is a schematic flowchart 2 of a beam failure processing method according to an embodiment of the present disclosure.

Referring to FIG. 3, FIG. 3 is a schematic flowchart 2 of a beam failure processing method according to an embodiment of the present disclosure. The beam failure processing method in this embodiment may be applied to a network side device. As shown in FIG. 3, the beam failure processing method in this embodiment may include the following steps.

Step 301: Receive a beam failure recovery request message sent by a terminal.

The beam failure recovery request message is a message sent in a case that the terminal determines, based on a BFD RS resource group, that a beam failure occurs in a first cell group, and the BFD RS resource group is configured in the first cell group.

Optionally, before the receiving a beam failure recovery request message sent by a terminal, the method further includes:
sending first configuration information to the terminal, where the first configuration information is used to configure the BFD RS resource group in the first cell group.

Optionally, the first configuration information includes a cell index of a cell in which the BFD RS resource group is located.

Optionally, before the receiving a beam failure recovery request message sent by a terminal, the method further includes:
sending second configuration information to the terminal, where the second configuration information is used to configure a candidate beam RS resource group in a second cell group.

Optionally, the receiving a beam failure recovery request message sent by a terminal includes:
receiving, in a first cell, the beam failure recovery request message sent by the terminal, where the first cell is a cell connected to the terminal.

Optionally, in a case that a primary cell and a secondary cell that are connected to the terminal are in a same frequency band, the first cell includes any one of the following:
the primary cell;
a preset cell in the first cell group or a second cell group;
a secondary cell outside the first cell group or the second cell group in cells connected to the terminal; and
a preset cell in a third cell group.

Optionally, in a case that the first cell is a secondary cell outside the first cell group or the second cell group in the cells connected to the terminal, the first cell meets at least one of the following:
being a secondary cell associated with the first cell group or the second cell group; or
being a secondary cell indicated by a network side; or
being a secondary cell selected from a plurality of secondary cells configured by a network side; or
being a secondary cell in a same frequency band with the first cell group or the second cell group, or being a secondary cell in a different frequency band from the first cell group or the second cell group.

Optionally, a primary cell connected to the terminal is in a first frequency range and a secondary cell connected to the terminal is in a second frequency range, or a primary cell and a secondary cell that are connected to the terminal are in different frequency bands in a second frequency range, where the first frequency range is less than the second frequency range; and
the first cell includes any one of the following:
the primary cell;
a cell in a same frequency band with the first cell group or the second cell group, where the second cell group is configured with a candidate beam RS resource group;
a secondary cell in a frequency band in the second frequency range other than a frequency band in which the first cell group or the second cell group is located; and
a preset cell in a fourth cell group.

Optionally, the receiving a beam failure recovery request message sent by a terminal includes:
receiving, in a second cell in a second manner, the beam failure recovery request message sent by the terminal, where
the second cell is a cell connected to the terminal.

Optionally, the second manner includes any one of the following:
receiving the beam failure recovery request message on a physical random access channel PRACH resource;
receiving the beam failure recovery request message on a physical uplink control channel PUCCH resource; and
receiving the beam failure recovery request message on a Medium Access Control MAC control element CE.

Optionally, in a case that the second manner is receiving the beam failure recovery request message on the PRACH resource, the PRACH resource is a contention-free PRACH resource and/or a contention PRACH resource; and
the receiving, in a second cell in a second manner, the beam failure recovery request message sent by the terminal includes:
receiving the beam failure recovery request message on the contention-free PRACH resource; or
in a case that the beam failure recovery request message fails to be received on the contention-free PRACH resource, receiving the beam failure recovery request message on the contention PRACH resource; or
in a case that a target candidate beam RS resource is not determined, receiving the beam failure recovery request message on the contention PRACH resource; or
in a case that the PRACH resource is only a contention PRACH resource, receiving the beam failure recovery request message on the contention PRACH resource.

Optionally, there is an association relationship between the contention-free PRACH resource and the target candidate beam RS resource.

Optionally, in a case that a primary cell and a secondary cell that are connected to the terminal are in different frequency bands, the PRACH resource is a PRACH resource configured in a frequency band in which the first cell group is located.

Optionally, in a case that the second manner is receiving the beam failure recovery request message on the PUCCH resource or receiving the beam failure recovery request message on the MAC CE, the beam failure recovery request message carries first information and/or second information, where the first information is used to indicate that a beam failure occurs in the first cell group, and the second information is used to indicate information about a candidate beam.

Optionally, the information about the candidate beam includes information about a target candidate beam RS resource.

Optionally, the second information includes at least one of the following:
an index of the target candidate beam RS resource;
a layer 1 reference signal received power L1-RSRP of the target candidate beam RS resource; and
a layer 1 signal to interference plus noise ratio L1-SINR of the target candidate beam RS resource.

Optionally, before the receiving, in a second cell in a second manner, the beam failure recovery request message sent by the terminal, the method further includes:
sending third configuration information to the terminal, where the third configuration information is used to configure a channel resource used in the second manner for the terminal in the second cell.

Optionally, in a case that the primary cell and the secondary cell that are connected to the terminal are in different frequency bands, and the second manner is receiving the beam failure recovery request message on the physical uplink control channel PUCCH resource, the third configuration information is used to configure the PUCCH resource in the primary cell.

Optionally, the receiving a beam failure recovery request message sent by a terminal includes:
receiving, on a target uplink beam, the beam failure recovery request message sent by the terminal, where the target uplink beam is at least one uplink beam in a third cell, and the third cell is a cell connected to the terminal.

Optionally, after the receiving a beam failure recovery request message sent by a terminal, the method further includes:
sending a beam failure recovery request response message to the terminal based on the beam failure recovery request message.

Optionally, the sending a beam failure recovery request response message to the terminal includes:
sending the beam failure recovery request response message to the terminal in a fourth cell, where the fourth cell includes any one of the following:
a primary cell connected to the terminal; or
a secondary cell in the first cell group, a second cell group, a third cell group, or a fourth cell group; and
a secondary cell outside the first cell group, the second cell group, the third cell group, or the fourth cell group in cells connected to the terminal; or
a preset cell in a fifth cell group, where
the second cell group is configured with a candidate beam RS resource group; the third cell group is a cell group in which a first cell is located in a case that a primary cell and a secondary cell that are connected to the terminal are in a same frequency band, and the first cell is a cell used to send the beam failure recovery request message; and the fourth cell group is a cell group in which the first cell is located in a case that the primary cell and the secondary cell are in different frequency bands.

It should be noted that this embodiment serves as an implementation of the network side device corresponding to the foregoing method embodiment in FIG. 2. Therefore, reference may be made to related descriptions in the foregoing method embodiment, and same beneficial effects can be achieved. To avoid repeated descriptions, details are not described herein again.

Figure 4:
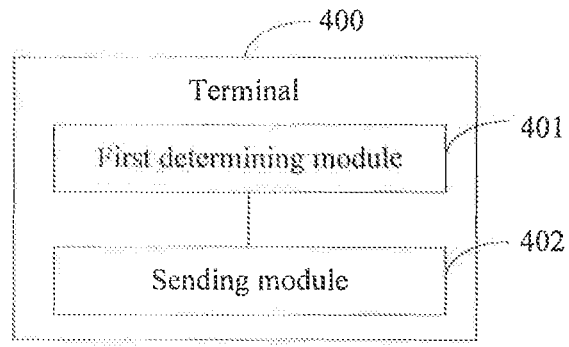
FIG. 4 is a schematic structural diagram 1 of a terminal according to an embodiment of the present disclosure.

Referring to FIG. 4, FIG. 4 is a structural diagram 1 of a terminal according to an embodiment of the present disclosure. As shown in FIG. 4, a terminal 400 includes:
a determining module 401, configured to determine, based on a beam failure detection reference signal BFD RS resource group, whether a beam failure occurs in a first cell group, where the BFD RS resource group is configured in the first cell group; and
a sending module 402, configured to send a beam failure recovery request message to a network side device in a case that a beam failure occurs in the first cell group.

Optionally, the first cell group includes:
some or all secondary cells in a same frequency band; or
a primary cell and at least one secondary cell in a same frequency band.

Optionally, the BFD RS resource group is configured in N preset cells in the first cell group, and N is a positive integer, where
the N preset cells are some cells in the first cell group, and each preset cell is a cell with a preset cell index; or the N preset cells are all cells in the first cell group; or
the N preset cells are primary cells in a case that the first cell group includes the primary cells.

Optionally, in a case that the N preset cells are some or all the cells, and N is greater than 1, the first determining module 401 is specifically configured to:
in a case that a beam failure occurs in all cells in the N preset cells, determine that a beam failure occurs in the first cell group; or
in a case that a beam failure occurs in a first quantity of cells in the N preset cells, determine that a beam failure occurs in the first cell group.

Optionally, the terminal 400 further includes:
a first receiving module, configured to receive first configuration information sent by the network side device, where the first configuration information is used to configure the BFD RS resource group in the first cell group.

Optionally, the first configuration information includes a cell index of a cell in which the BFD RS resource group is located.

Optionally, the terminal 400 further includes:
a second determining module, configured to determine a target candidate beam RS resource based on a candidate beam RS resource group, where
the beam failure recovery request message is used to indicate information about the target candidate beam RS resource, and the candidate beam RS resource group is configured in a second cell group.

Optionally, the terminal 400 further includes:
a second receiving module, configured to receive second configuration information sent by the network side device, where the second configuration information is used to configure the candidate beam RS resource group in the second cell group.

Optionally, the sending module 401 is specifically configured to:
send the beam failure recovery request message to the network side device in a first cell, where the first cell is a cell connected to the terminal.

Optionally, in a case that a primary cell and a secondary cell that are connected to the terminal are in a same frequency band, the first cell includes any one of the following:
the primary cell;
a preset cell in the first cell group or a second cell group, where a candidate beam RS resource group is configured in the second cell group;
a secondary cell outside the first cell group or the second cell group in cells connected to the terminal; and
a preset cell in a third cell group.

Optionally, in a case that the first cell is a secondary cell outside the first cell group or the second cell group in the cells connected to the terminal, the first cell meets at least one of the following:
being a secondary cell associated with the first cell group or the second cell group; or
being a secondary cell indicated by a network side; or
being a secondary cell selected from a plurality of secondary cells configured by a network side; or
being a secondary cell in a same frequency band with the first cell group or the second cell group, or being a secondary cell in a different frequency band from the first cell group or the second cell group.

Optionally, a primary cell connected to the terminal is in a first frequency range and a secondary cell connected to the terminal is in a second frequency range, or a primary cell and a secondary cell that are connected to the terminal are in different frequency bands in a second frequency range, where the first frequency range is less than the second frequency range; and
the first cell includes any one of the following:
the primary cell;
a cell in a same frequency band with the first cell group or the second cell group, where the second cell group is a cell group configured with a candidate beam RS resource group;
a secondary cell in a frequency band in the second frequency range other than a frequency band in which the first cell group or the second cell group is located; and
a preset cell in a fourth cell group.

Optionally, the sending module 401 is specifically configured to:
send the beam failure recovery request message to the network side device in a second cell in a first manner, where
the second cell is a cell connected to the terminal.

Optionally, the first manner includes any one of the following:
sending the beam failure recovery request message on a physical random access channel PRACH resource;
sending the beam failure recovery request message on a physical uplink control channel PUCCH resource; and
sending the beam failure recovery request message on a Medium Access Control MAC control element CE.

Optionally, in a case that the first manner is sending the beam failure recovery request message on the PRACH resource, the PRACH resource is a contention-free PRACH resource and/or a contention PRACH resource; and
the sending module 401 is specifically configured to:
send the beam failure recovery request message on the contention-free PRACH resource; or
in a case that the beam failure recovery request message fails to be sent on the contention-free PRACH resource, send the beam failure recovery request message on the contention PRACH resource; or
in a case that a target candidate beam RS resource is not determined, send the beam failure recovery request message on the contention PRACH resource; or
in a case that the PRACH resource is only a contention PRACH resource, send the beam failure recovery request message on the contention PRACH resource.

Optionally, there is an association relationship between the contention-free PRACH resource and the target candidate beam RS resource.

Optionally, in a case that a primary cell and a secondary cell that are connected to the terminal are in different frequency bands, the PRACH resource is a PRACH resource configured in a frequency band in which the first cell group is located.

Optionally, in a case that in the first manner is sending the beam failure recovery request message on the PUCCH resource or sending the beam failure recovery request message on the MAC CE, the beam failure recovery request message carries first information and/or second information, where the first information is used to indicate that a beam failure occurs in the first cell group, and the second information is used to indicate information about a candidate beam.

Optionally, the information about the candidate beam includes information about a target candidate beam RS resource.

Optionally, the second information includes at least one of the following:
 an index of the target candidate beam RS resource;
 a layer 1 reference signal received power L1-RSRP of the target candidate beam RS resource; and
 a layer 1 signal to interference plus noise ratio L1-SINR of the target candidate beam RS resource.

Optionally, the terminal 400 further includes:
 a third receiving module, configured to receive third configuration information sent by the network side device, where the third configuration information is used to configure a channel resource used in the first manner for the terminal in the second cell.

Optionally, in a case that the primary cell and the secondary cell that are connected to the terminal are in different frequency bands, and the first manner is sending the beam failure recovery request message on the physical uplink control channel PUCCH resource, the third configuration information is used to configure the PUCCH resource in the primary cell.

Optionally, the sending module 401 is specifically configured to:
 send the beam failure recovery request message to the network side device on a target uplink beam, where the target uplink beam is at least one uplink beam in a third cell, and the third cell is a cell connected to the terminal.

Optionally, the terminal 400 further includes:
 a third determining module, configured to determine the target uplink beam based on a preset uplink beam, where the preset uplink beam includes at least one of the following:
 a beam of an uplink channel and/or an uplink reference signal last sent by the terminal;
 a beam of a PUCCH last sent by the terminal; and
 a beam of a preset PUCCH in a preset cell and/or a preset bandwidth part BWP, and the preset PUCCH has a preset PUCCH resource index.

Optionally, the terminal 400 further includes:
 a fourth receiving module, configured to receive a beam failure recovery request response message sent by the network side device.

Optionally, the fourth receiving module is specifically configured to:
 receive, in a fourth cell, the beam failure recovery request response message sent by the network side device, where the fourth cell includes any one of the following:
 a primary cell connected to the terminal; or
 a secondary cell in the first cell group, a second cell group, a third cell group, or a fourth cell group; and
 a secondary cell outside the first cell group, the second cell group, the third cell group, or the fourth cell group in cells connected to the terminal; or
 a preset cell in a fifth cell group, where
 the second cell group is configured with a candidate beam RS resource group; the third cell group is a cell group in which a first cell is located in a case that a primary cell and a secondary cell that are connected to the terminal are in a same frequency band, and the first cell is a cell used to send the beam failure recovery request message; and the fourth cell group is a cell group in which the first cell is located in a case that the primary cell and the secondary cell are in different frequency bands.

The terminal 400 can implement the processes in the method embodiment in FIG. 2 in the present disclosure and achieve a same beneficial effect. To avoid repetition, details are not described herein again.

Figure 5:
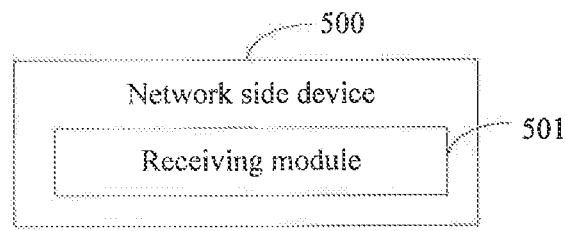
FIG. 5 is a schematic s structural diagram 1 of a network side device according to an embodiment of the present disclosure.

Referring to FIG. 5, FIG. 5 is a structural diagram 1 of a network side device according to an embodiment of the present disclosure. As shown in FIG. 5, a network side device 500 includes:
 a receiving module 501, configured to receive a beam failure recovery request message sent by a terminal, where
 the beam failure recovery request message is a message sent in a case that the terminal determines, based on a BFD RS resource group, that a beam failure occurs in a first cell group, and the BFD RS resource group is configured in the first cell group.

Optionally, the network side device 500 further includes:
 a first sending module, configured to send first configuration information to the terminal, where the first configuration information is used to configure the BFD RS resource group in the first cell group.

Optionally, the first configuration information includes a cell index of a cell in which the BFD RS resource group is located.

Optionally, the network side device 500 further includes:
 a second sending module, configured to send second configuration information to the terminal, where the second configuration information is used to configure a candidate beam RS resource group in a second cell group.

Optionally, the receiving module 501 is specifically configured to:
 receive, in a first cell, the beam failure recovery request message sent by the terminal, where the first cell is a cell connected to the terminal.

Optionally, in a case that a primary cell and a secondary cell that are connected to the terminal are in a same frequency band, the first cell includes any one of the following:
 the primary cell;
 a preset cell in the first cell group or a second cell group, where a candidate beam RS resource group is configured in the second cell group;
 a secondary cell outside the first cell group or the second cell group in cells connected to the terminal; and
 a preset cell in a third cell group.

Optionally, in a case that the first cell is a secondary cell outside the first cell group or the second cell group in the cells connected to the terminal, the first cell meets at least one of the following:
 being a secondary cell associated with the first cell group or the second cell group; or
 being a secondary cell indicated by a network side; or
 being a secondary cell selected from a plurality of secondary cells configured by a network side; or
 being a secondary cell in a same frequency band with the first cell group or the second cell group, or being a secondary cell in a different frequency band from the first cell group or the second cell group.

Optionally, a primary cell connected to the terminal is in a first frequency range and a secondary cell connected to the terminal is in a second frequency range, or a primary cell and a secondary cell that are connected to the terminal are in different frequency bands in a second frequency range, where the first frequency range is less than the second frequency range; and the first cell includes any one of the following:
the primary cell;
a cell in a same frequency band with the first cell group or the second cell group, where the second cell group is a cell group configured with a candidate beam RS resource group;
a secondary cell in a frequency band in the second frequency range other than a frequency band in which the first cell group or the second cell group is located; and
a preset cell in a fourth cell group.

Optionally, the receiving module 501 is specifically configured to:
receive, in a second cell in a second manner, the beam failure recovery request message sent by the terminal, where
the second cell is a cell connected to the terminal.

Optionally, the second manner includes any one of the following:
receiving the beam failure recovery request message on a physical random access channel PRACH resource;
receiving the beam failure recovery request message on a physical uplink control channel PUCCH resource; and
receiving the beam failure recovery request message on a Medium Access Control MAC control element CE.

Optionally, in a case that the second manner is receiving the beam failure recovery request message on the PRACH resource, the PRACH resource is a contention-free PRACH resource and/or a contention PRACH resource; and
the receiving module 501 is specifically configured to:
receive the beam failure recovery request message on the contention-free PRACH resource; or
in a case that the beam failure recovery request message fails to be received on the contention-free PRACH resource, receive the beam failure recovery request message on the contention PRACH resource; or
in a case that a target candidate beam RS resource is not determined, receive the beam failure recovery request message on the contention PRACH resource; or
in a case that the PRACH resource is only a contention PRACH resource, receive the beam failure recovery request message on the contention PRACH resource.

Optionally, there is an association relationship between the contention-free PRACH resource and the target candidate beam RS resource.

Optionally, in a case that a primary cell and a secondary cell that are connected to the terminal are in different frequency bands, the PRACH resource is a PRACH resource configured in a frequency band in which the first cell group is located.

Optionally, in a case that the second manner is receiving the beam failure recovery request message on the PUCCH resource or receiving the beam failure recovery request message on the MAC CE, the beam failure recovery request message carries first information and/or second information, where the first information is used to indicate that a beam failure occurs in the first cell group, and the second information is used to indicate information about a candidate beam.

Optionally, the information about the candidate beam includes information about a target candidate beam RS resource.

Optionally, the second information includes at least one of the following:
an index of the target candidate beam RS resource;
a layer 1 reference signal received power L1-RSRP of the target candidate beam RS resource; and
a layer 1 signal to interference plus noise ratio L1-SINR of the target candidate beam RS resource.

Optionally, the network side device 500 further includes:
a third sending module, configured to send third configuration information to the terminal, where the third configuration information is used to configure a channel resource used in the second manner for the terminal in the second cell.

Optionally, in a case that the primary cell and the secondary cell that are connected to the terminal are in different frequency bands, and the second manner is receiving the beam failure recovery request message on the physical uplink control channel PUCCH resource, the third configuration information is used to configure the PUCCH resource in the primary cell.

Optionally, the receiving module 501 is specifically configured to:
receive, on a target uplink beam, the beam failure recovery request message sent by the terminal, where the target uplink beam is at least one uplink beam in a third cell, and the third cell is a cell connected to the terminal.

Optionally, the network side device 500 further includes:
a fourth sending module, configured to send a beam failure recovery request response message to the terminal based on the beam failure recovery request message.

Optionally, the fourth sending module is specifically configured to:
send the beam failure recovery request response message to the terminal in a fourth cell, where the fourth cell includes any one of the following:
a primary cell connected to the terminal; or
a secondary cell in the first cell group, a second cell group, a third cell group, or a fourth cell group; and
a secondary cell outside the first cell group, the second cell group, the third cell group, or the fourth cell group in cells connected to the terminal; or
a preset cell in a fifth cell group, where
the second cell group is configured with a candidate beam RS resource group; the third cell group is a cell group in which a first cell is located in a case that a primary cell and a secondary cell that are connected to the terminal are in a same frequency band, and the first cell is a cell used to send the beam failure recovery request message; and the fourth cell group is a cell group in which the first cell is located in a case that the primary cell and the secondary cell are in different frequency bands.

The network side device 500 can implement the processes in the method embodiment in FIG. 3 in the present disclosure and achieve a same beneficial effect. To avoid repetition, details are not described herein again.

Figure 6:
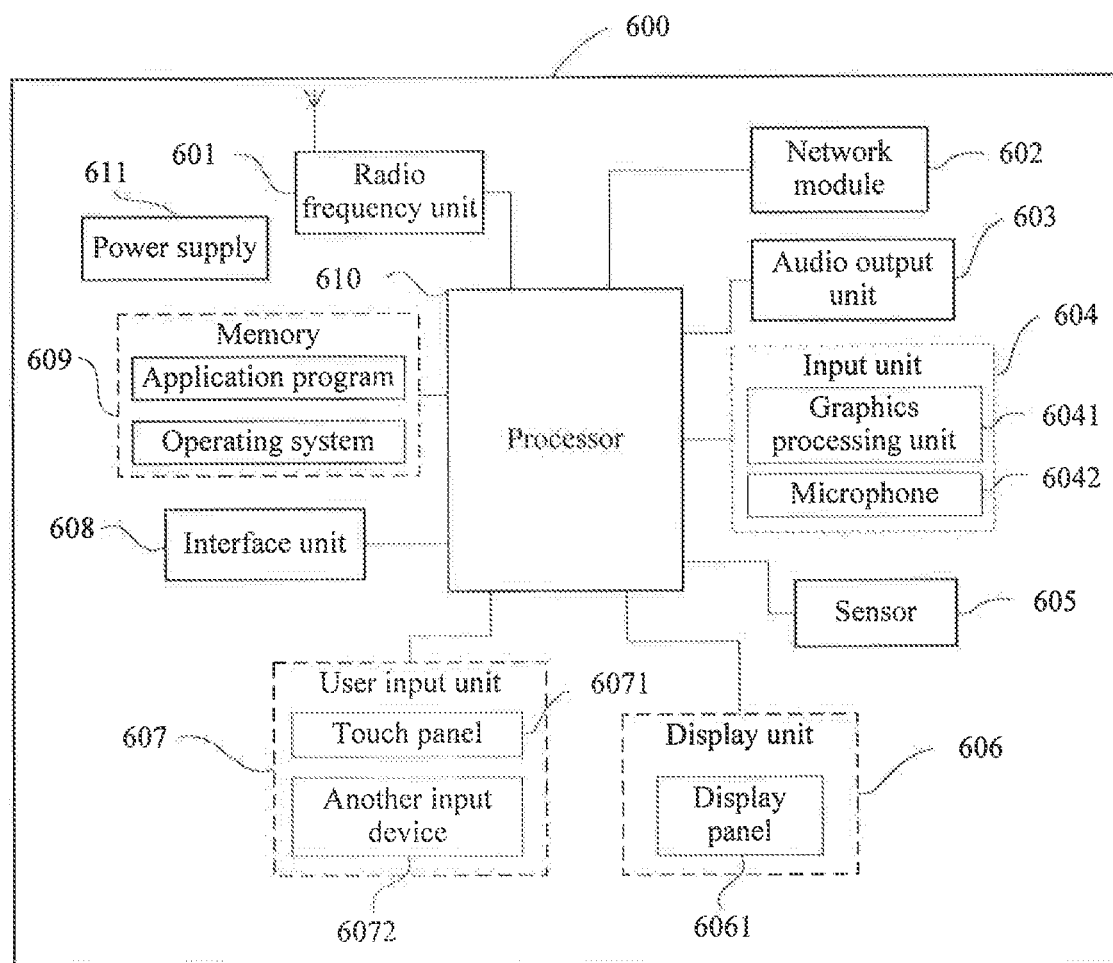
FIG. 6 is a schematic structural diagram 2 of a terminal according to an embodiment of the present disclosure.

Referring to FIG. 6, FIG. 6 is a structural diagram 2 of a terminal according to an embodiment of the present disclosure. The terminal may be a schematic diagram of a hardware structure of a terminal that implements the embodiments of the present disclosure. As shown in FIG. 6, the terminal 600 includes but is not limited to: a radio frequency unit 601, a network module 602, an audio output unit 603, an input unit 604, a sensor 605, a display unit 606, a user input unit 607, an interface unit 608, a memory 609, a processor 610, a power supply 611, and the like. A person skilled in the art may understand that the structure of the terminal shown in FIG. 6 does not constitute a limitation to the terminal. The terminal may include more or fewer components than that shown in the figure, or a combination of some components, or an arrangement of different components. In this embodiment of the present disclosure, the terminal includes but is not limited to a mobile phone, a tablet computer, a notebook computer, a palmtop computer, a vehicle-mounted terminal, a wearable device, a pedometer, or the like.

The processor 610 is configured to determine, based on a beam failure detection reference signal BFD RS resource group, whether a beam failure occurs in a first cell group, where the BFD RS resource group is configured in the first cell group; and the radio frequency unit 601 is configured to send a beam failure recovery request message to a network side device in a case that a beam failure occurs in the first cell group.

Optionally, the first cell group includes:

some or all secondary cells in a same frequency band; or a primary cell and at least one secondary cell in a same frequency band.

Optionally, the BFD RS resource group is configured in N preset cells in the first cell group, and N is a positive integer, where the N preset cells are some cells in the first cell group, and each preset cell is a cell with a preset cell index; or the N preset cells are all cells in the first cell group; or the N preset cells are primary cells in a case that the first cell group includes the primary cells.

Optionally, in a case that the N preset cells are some or all the cells, and N is greater than 1, the processor 610 is specifically configured to:

in a case that a beam failure occurs in all cells in the N preset cells, determine that a beam failure occurs in the first cell group; or in a case that a beam failure occurs in a first quantity of cells in the N preset cells, determine that a beam failure occurs in the first cell group.

Optionally, the radio frequency unit 601 is further configured to:

receive first configuration information sent by the network side device, where the first configuration information is used to configure the BFD RS resource group in the first cell group.

Optionally, the first configuration information includes a cell index of a cell in which the BFD RS resource group is located.

Optionally, the radio frequency unit 601 is further configured to:

determine a target candidate beam RS resource based on a candidate beam RS resource group, where the beam failure recovery request message is used to indicate information about the target candidate beam RS resource, and the candidate beam RS resource group is configured in a second cell group.

Optionally, the radio frequency unit 601 is further configured to:

receive second configuration information sent by the network side device, where the second configuration information is used to configure the candidate beam RS resource group in the second cell group.

Optionally, the radio frequency unit 601 is specifically configured to:

send the beam failure recovery request message to the network side device in a first cell, where the first cell is a cell connected to the terminal.

Optionally, in a case that a primary cell and a secondary cell that are connected to the terminal are in a same frequency band, the first cell includes any one of the following:

the primary cell;

a preset cell in the first cell group or a second cell group, where a candidate beam RS resource group is configured in the second cell group;

a secondary cell outside the first cell group or the second cell group in cells connected to the terminal; and a preset cell in a third cell group.

Optionally, in a case that the first cell is a secondary cell outside the first cell group or the second cell group in the cells connected to the terminal, the first cell meets at least one of the following:

being a secondary cell associated with the first cell group or the second cell group; or being a secondary cell indicated by a network side; or being a secondary cell selected from a plurality of secondary cells configured by a network side; or being a secondary cell in a same frequency band with the first cell group or the second cell group, or being a secondary cell in a different frequency band from the first cell group or the second cell group.

Optionally, a primary cell connected to the terminal is in a first frequency range and a secondary cell connected to the terminal is in a second frequency range, or a primary cell and a secondary cell that are connected to the terminal are in different frequency bands in a second frequency range, where the first frequency range is less than the second frequency range; and the first cell includes any one of the following:

the primary cell;

a cell in a same frequency band with the first cell group or the second cell group, where the second cell group is a cell group configured with a candidate beam RS resource group;

a secondary cell in a frequency band in the second frequency range other than a frequency band in which the first cell group or the second cell group is located; and a preset cell in a fourth cell group.

Optionally, the radio frequency unit 601 is specifically configured to:

send the beam failure recovery request message to the network side device in a second cell in a first manner, where the second cell is a cell connected to the terminal.

Optionally, the first manner includes any one of the following:

sending the beam failure recovery request message on a physical random access channel PRACH resource;

sending the beam failure recovery request message on a physical uplink control channel PUCCH resource; and sending the beam failure recovery request message on a Medium Access Control MAC control element CE.

Optionally, in a case that the first manner is sending the beam failure recovery request message on the PRACH resource, the PRACH resource is a contention-free PRACH resource and/or a contention PRACH resource; and the radio frequency unit 601 is specifically configured to:

send the beam failure recovery request message on the contention-free PRACH resource; or in a case that the beam failure recovery request message fails to be sent on the contention-free PRACH resource, send the beam failure recovery request message on the contention PRACH resource; or in a case that a target candidate beam RS resource is not determined, send the beam failure recovery request message on the contention PRACH resource; or in a case that the PRACH resource is only a contention PRACH resource, send the beam failure recovery request message on the contention PRACH resource.

Optionally, there is an association relationship between the contention-free PRACH resource and the target candidate beam RS resource.

Optionally, in a case that a primary cell and a secondary cell that are connected to the terminal are in different frequency bands, the PRACH resource is a PRACH resource configured in a frequency band in which the first cell group is located.

Optionally, in a case that in the first manner is sending the beam failure recovery request message on the PUCCH resource or sending the beam failure recovery request message on the MAC CE, the beam failure recovery request message carries first information and/or second information, where the first information is used to indicate that a beam failure occurs in the first cell group, and the second information is used to indicate information about a candidate beam.

Optionally, the information about the candidate beam includes information about a target candidate beam RS resource.

Optionally, the second information includes at least one of the following:

an index of the target candidate beam RS resource;

a layer 1 reference signal received power L1-RSRP of the target candidate beam RS resource; and a layer 1 signal to interference plus noise ratio L1-SINR of the target candidate beam RS resource.

Optionally, the radio frequency unit 601 is further configured to:

receive third configuration information sent by the network side device, where the third configuration information is used to configure a channel resource used in the first manner for the terminal in the second cell.

Optionally, in a case that the primary cell and the secondary cell that are connected to the terminal are in different frequency bands, and the first manner is sending the beam failure recovery request message on the physical uplink control channel PUCCH resource, the third configuration information is used to configure the PUCCH resource in the primary cell.

Optionally, the radio frequency unit 601 is specifically configured to:

send the beam failure recovery request message to the network side device on a target uplink beam, where the target uplink beam is at least one uplink beam in a third cell, and the third cell is a cell connected to the terminal.

Optionally, the processor 610 is further configured to:

determine the target uplink beam based on a preset uplink beam, where the preset uplink beam includes at least one of the following:

a beam of an uplink channel and/or an uplink reference signal last sent by the terminal;

a beam of a PUCCH last sent by the terminal; and a beam of a preset PUCCH in a preset cell and/or a preset bandwidth part BWP, and the preset PUCCH has a preset PUCCH resource index.

Optionally, the radio frequency unit 601 is further configured to:

receive a beam failure recovery request response message sent by the network side device.

Optionally, the radio frequency unit 601 is specifically configured to:

receive, in a fourth cell, the beam failure recovery request response message sent by the network side device, where the fourth cell includes any one of the following:

a primary cell connected to the terminal; or a secondary cell in the first cell group, a second cell group, a third cell group, or a fourth cell group; and a secondary cell outside the first cell group, the second cell group, the third cell group, or the fourth cell group in cells connected to the terminal; or a preset cell in a fifth cell group, where the second cell group is configured with a candidate beam RS resource group; the third cell group is a cell group in which a first cell is located in a case that a primary cell and a secondary cell that are connected to the terminal are in a same frequency band, and the first cell is a cell used to send the beam failure recovery request message; and the fourth cell group is a cell group in which the first cell is located in a case that the primary cell and the secondary cell are in different frequency bands.

It should be noted that the terminal 600 in this embodiment can implement each process in the method embodiment corresponding to FIG. 2 in the embodiments of the present disclosure, and achieve same beneficial effects. To avoid repetition, details are not described herein again It should be understood that, in this embodiment of the present disclosure, the radio frequency unit 601 may be configured to receive and send information or a signal in a call process. Optionally, after receiving downlink data from a base station, the radio frequency unit 601 sends the downlink data to the processor 610 for processing. In addition, the radio frequency unit 601 sends uplink data to the base station. Usually, the radio frequency unit 601 includes but is not limited to an antenna, at least one amplifier, a transceiver, a coupler, a low noise amplifier, a duplexer, and the like. In addition, the radio frequency unit 601 can also communicate with another device through a wireless communications system and network.

The terminal provides wireless broadband Internet access for the user by using the network module 602, for example, helping the user to send and receive an e-mail, browse a web page, and access streaming media.

The audio output unit 603 can convert audio data received by the radio frequency unit 601 or the network module 602 or stored in the memory 609 into an audio signal, and output the audio signal into sound. In addition, the audio output unit 603 can also provide audio output related to a specific function performed by the terminal 600 (for example, call signal receiving sound or message receiving sound). The audio output unit 603 includes a speaker, a buzzer, a telephone receiver, and the like.

The input unit 604 is configured to receive an audio signal or a video signal. The input unit 604 may include a graphics processing unit (GPU) 6041 and a microphone 6042. The graphics processing unit 6041 processes image data of a static image or a video obtained by an image capturing apparatus (such as, a camera) in a video capturing mode or an image capturing mode. A processed image frame may be displayed on the display unit 606. The image frame processed by the graphics processing unit 6041 can be stored in the memory 609 (or another storage medium) or sent via the radio frequency unit 601 or the network module 602. The microphone 6042 may receive sound and can process such sound into audio data. Processed audio data may be converted, in a call mode, into a format that can be sent to a mobile communication base station by using the radio frequency unit 601 for output.

The terminal 600 further includes at least one sensor 605, for example, a light sensor, a motion sensor, and another sensor. Optionally, the light sensor includes an ambient light sensor and a proximity sensor, where the ambient light sensor can adjust brightness of a display panel 6061 based on brightness of ambient light, and the proximity sensor can turn off the display panel 6061 and/or backlight when the terminal 600 is moved towards the ear. As a type of the motion sensor, an accelerometer sensor may detect an acceleration value in each direction (generally, three axes), and detect a value and a direction of gravity when the accelerometer sensor is static, and may be used in an application for recognizing a mobile terminal posture (such as screen switching between landscape and portrait modes, a related game, or magnetometer posture calibration), a function related to vibration recognition (such as a pedometer or a knock), and the like. The sensor 605 may further include a fingerprint sensor, a pressure sensor, an iris sensor, a molecular sensor, a gyroscope, a barometer, a hygrometer, a thermometer, an infrared sensor, and the like. Details are not described herein.

The display unit 606 is configured to display information entered by a user or information provided for the user. The display unit 606 may include a display panel 6061. The display panel 6061 may be configured in a form of a liquid crystal display (LCD), an organic light-emitting diode (OLED), or the like.

The user input unit 607 can be configured to receive input numeric or character information, and generate key signal inputs related to user settings and function control of the terminal. Optionally, the user input unit 607 includes a touch panel 6071 and another input device 6072. The touch panel 6071 is also referred to as a touchscreen, and may collect a touch operation performed by a user on or near the touch panel 6071 (such as an operation performed by a user on the touch panel 6071 or near the touch panel 6071 by using any proper object or accessory, such as a finger or a stylus). The touch panel 6071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, and sends the touch point coordinates to the processor 610, and can receive and execute a command sent by the processor 610. In addition, the touch panel 6071 may be of a resistive type, a capacitive type, an infrared type, a surface acoustic wave type, or the like. In addition to the touch panel 6071, the user input unit 607 may further include the another input device 6072. Optionally, the another input device 6072 may include but is not limited to a physical keyboard, a functional button (such as a volume control button or a power on/off button), a trackball, a mouse, and a joystick. Details are not described herein.

Further, the touch panel 6071 may cover the display panel 6061. When detecting the touch operation on or near the touch panel 6071, the touch panel 6071 transmits the touch operation to the processor 610 to determine a type of a touch event, and then the processor 610 provides corresponding visual output on the display panel 6061 based on the type of the touch event. In FIG. 6, although the touch panel 6071 and the display panel 6061 are used as two independent parts to implement input and output functions of the terminal, in some embodiments, the touch panel 6071 and the display panel 6061 may be integrated to implement the input and output functions of the terminal. This is not specifically limited herein.

The interface unit 608 is an interface connecting an external apparatus to the terminal 600. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, and a headset port. The interface unit 608 may be configured to receive input (for example, data information and power) from an external apparatus and transmit the received input to one or more elements in the terminal 600 or may be configured to transmit data between the terminal 600 and an external apparatus.

The memory 609 may be configured to store a software program and various data. The memory 609 may mainly include a program storage area and a data storage area. The program storage area may store an operating system, an application program required by at least one function (such as a sound play function or an image play function), and the like. The data storage area may store data (such as audio data or an address book) created based on use of the mobile phone, and the like. In addition, the memory 609 may include a high-speed random access memory or a nonvolatile memory, for example, at least one disk storage device, a flash memory, or another volatile solid-state storage device.

The processor 610 is a control center of the terminal, connects various parts of the entire terminal by using various interfaces and circuits, and performs various functions of the terminal and processes data by running or executing software programs and/or modules stored in the memory 609 and invoking data stored in the memory 609, so as to monitor the terminal as a whole. The processor 610 may include one or more processing units. Optionally, the processor 610 may integrate an application processor and a modem processor. The application processor mainly deals with an operating system, a user interface, an application program, and the like. The modem processor mainly deals with wireless communication. It may be understood that, alternatively, the modem processor may not be integrated into the processor 610.

The terminal 600 may further include the power supply 611 (for example, a battery) configured to supply power to various components. Optionally, the power supply 611 may be logically connected to the processor 610 through a power management system, so as to implement functions such as managing charging, discharging, and power consumption through the power management system.

In addition, the terminal 600 includes some function modules not shown, and details are not described herein.

Optionally, an embodiment of the present disclosure further provides a terminal, including a processor 610, a memory 609, and a computer program that is stored in the memory 609 and that can run on the processor 610. When the processor 610 executes the computer program, the foregoing processes of the method embodiment in FIG. 3 are implemented and a same technical effect can be achieved. To avoid repetition, details are not described herein again.

Figure 7:
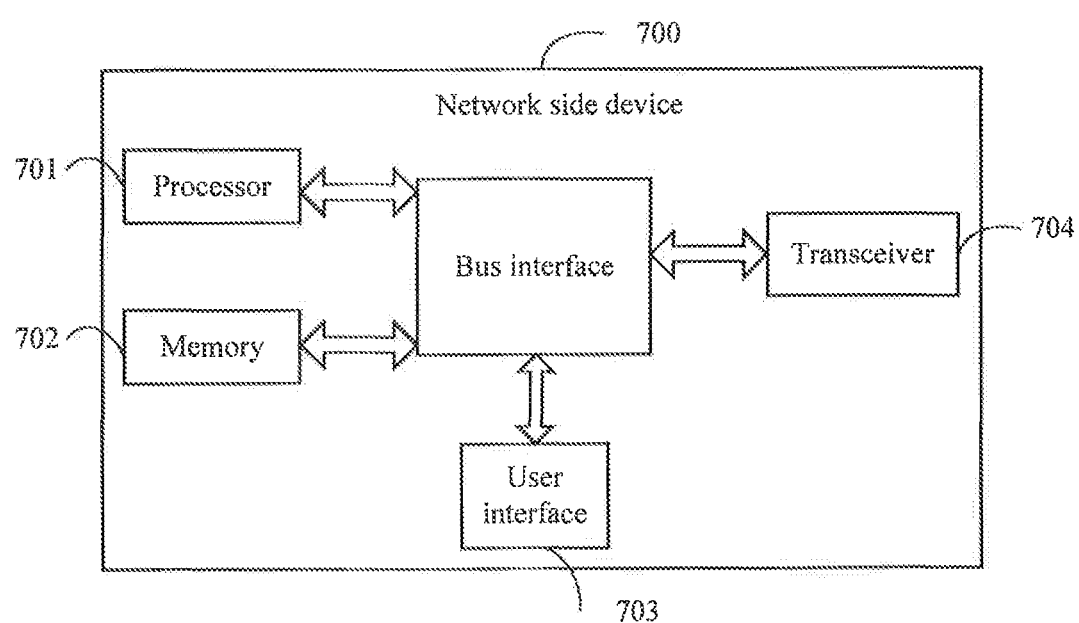
FIG. 7 is a schematic s structural diagram 2 of a network side device according to an embodiment of the present disclosure.

Referring to FIG. 7, FIG. 7 is a structural diagram 2 of a network side device according to an embodiment of the present disclosure. As shown in FIG. 7, a network side device 700 includes a processor 701, a memory 702, a user interface 703, a transceiver 704, and a bus interface.

In this embodiment of the present disclosure, the network side device 700 further includes a computer program that is stored in the memory 702 and that can run on the processor 701, and when the processor 701 executes the computer program, the transceiver 704 is configured to:

receive a beam failure recovery request message sent by a terminal, where the beam failure recovery request message is a message sent in a case that the terminal determines, based on a BFD RS resource group, that a beam failure occurs in a first cell group, and the BFD RS resource group is configured in the first cell group.

Optionally, the transceiver 704 is further configured to:

send first configuration information to the terminal, where the first configuration information is used to configure the BFD RS resource group in the first cell group.

Optionally, the first configuration information includes a cell index of a cell in which the BFD RS resource group is located.

Optionally, the transceiver 704 is further configured to:

send second configuration information to the terminal, where the second configuration information is used to configure a candidate beam RS resource group in a second cell group.

Optionally, the transceiver 704 is specifically configured to:

receive, in a first cell, the beam failure recovery request message sent by the terminal, where the first cell is a cell connected to the terminal.

Optionally, in a case that a primary cell and a secondary cell that are connected to the terminal are in a same frequency band, the first cell includes any one of the following:

the primary cell;

a preset cell in the first cell group or a second cell group, where a candidate beam RS resource group is configured in the second cell group;

a secondary cell outside the first cell group or the second cell group in cells connected to the terminal; and a preset cell in a third cell group.

Optionally, in a case that the first cell is a secondary cell outside the first cell group or the second cell group in the cells connected to the terminal, the first cell meets at least one of the following:

being a secondary cell associated with the first cell group or the second cell group; or being a secondary cell indicated by a network side; or being a secondary cell selected from a plurality of secondary cells configured by a network side; or being a secondary cell in a same frequency band with the first cell group or the second cell group, or being a secondary cell in a different frequency band from the first cell group or the second cell group.

Optionally, a primary cell connected to the terminal is in a first frequency range and a secondary cell connected to the terminal is in a second frequency range, or a primary cell and a secondary cell that are connected to the terminal are in different frequency bands in a second frequency range, where the first frequency range is less than the second frequency range; and the first cell includes any one of the following:

the primary cell;

a cell in a same frequency band with the first cell group or the second cell group, where the second cell group is a cell group configured with a candidate beam RS resource group;

a secondary cell in a frequency band in the second frequency range other than a frequency band in which the first cell group or the second cell group is located; and a preset cell in a fourth cell group.

Optionally, the transceiver 704 is specifically configured to:

receive, in a second cell in a second manner, the beam failure recovery request message sent by the terminal, where the second cell is a cell connected to the terminal.

Optionally, the second manner includes any one of the following:

receiving the beam failure recovery request message on a physical random access channel PRACH resource;

receiving the beam failure recovery request message on a physical uplink control channel PUCCH resource; and receiving the beam failure recovery request message on a Medium Access Control MAC control element CE.

Optionally, in a case that the second manner is receiving the beam failure recovery request message on the PRACH resource, the PRACH resource is a contention-free PRACH resource and/or a contention PRACH resource; and the transceiver 704 is specifically configured to:

receive the beam failure recovery request message on the contention-free PRACH resource; or in a case that the beam failure recovery request message fails to be received on the contention-free PRACH resource, receive the beam failure recovery request message on the contention PRACH resource; or in a case that a target candidate beam RS resource is not determined, receive the beam failure recovery request message on the contention PRACH resource; or in a case that the PRACH resource is only a contention PRACH resource, receive the beam failure recovery request message on the contention PRACH resource.

Optionally, there is an association relationship between the contention-free PRACH resource and the target candidate beam RS resource.

Optionally, in a case that a primary cell and a secondary cell that are connected to the terminal are in different frequency bands, the PRACH resource is a PRACH resource configured in a frequency band in which the first cell group is located.

Optionally, in a case that the second manner is receiving the beam failure recovery request message on the PUCCH resource or receiving the beam failure recovery request message on the MAC CE, the beam failure recovery request message carries first information and/or second information, where the first information is used to indicate that a beam failure occurs in the first cell group, and the second information is used to indicate information about a candidate beam.

Optionally, the information about the candidate beam includes information about a target candidate beam RS resource.

Optionally, the second information includes at least one of the following:

an index of the target candidate beam RS resource;

a layer 1 reference signal received power L1-RSRP of the target candidate beam RS resource; and a layer 1 signal to interference plus noise ratio L1-SINR of the target candidate beam RS resource.

Optionally, the transceiver 704 is further configured to:

send third configuration information to the terminal, where the third configuration information is used to configure a channel resource used in the second manner for the terminal in the second cell.

Optionally, in a case that the primary cell and the secondary cell that are connected to the terminal are in different frequency bands, and the second manner is receiving the beam failure recovery request message on the physical uplink control channel PUCCH resource, the third configuration information is used to configure the PUCCH resource in the primary cell.

Optionally, the transceiver 704 is specifically configured to:

receive, on a target uplink beam, the beam failure recovery request message sent by the terminal, where the target uplink beam is at least one uplink beam in a third cell, and the third cell is a cell connected to the terminal.

Optionally, the transceiver 704 is further configured to:
send a beam failure recovery request response message to the terminal based on the beam failure recovery request message.

Optionally, the transceiver 704 is specifically configured to:

send the beam failure recovery request response message to the terminal in a fourth cell, where the fourth cell includes any one of the following:
a primary cell connected to the terminal; or
a secondary cell in the first cell group, a second cell group, a third cell group, or a fourth cell group; and
a secondary cell outside the first cell group, the second cell group, the third cell group, or the fourth cell group in cells connected to the terminal; or
a preset cell in a fifth cell group, where
the second cell group is configured with a candidate beam RS resource group; the third cell group is a cell group in which a first cell is located in a case that a primary cell and a secondary cell that are connected to the terminal are in a same frequency band, and the first cell is a cell used to send the beam failure recovery request message; and the fourth cell group is a cell group in which the first cell is located in a case that the primary cell and the secondary cell are in different frequency bands.

In FIG. 7, a bus architecture may include any quantity of interconnected buses and bridges. Optionally, various circuits of one or more processors represented by the processor 701 and a memory represented by the memory 702 are interconnected. The bus architecture may further link various other circuits such as a peripheral device, a voltage regulator, and a power management circuit. These are well known in the art, and therefore are not further described in this specification. The bus interface provides an interface. The transceiver 704 may be a plurality of components. To be specific, the transceiver 704 includes a transmitter and a receiver, and provides a unit configured to communicate with various other apparatuses on a transmission medium. For different user equipment, the user interface 703 may alternatively be an interface for externally and internally connecting required equipment. The connected equipment includes but is not limited to a keypad, a display, a speaker, a microphone, a joystick, and the like.

The processor 701 is responsible for bus architecture management and general processing. The memory 702 may store data used by the processor 701 when the processor 701 performs an operation.

The network side device 700 can implement each process implemented by the network side device in the foregoing method embodiments in FIG. 3. To avoid repetition, details are not described herein again.

An embodiment of the present disclosure further provides a computer-readable storage medium. The computer-readable storage medium stores a computer program, and when a processor executes the computer program, the processes in the method embodiment shown in FIG. 2 or FIG. 3 are implemented, and a same technical effect can be achieved. To avoid repetition, details are not described herein. The computer-readable storage medium is, for example, a read-only memory (ROM), a random access memory (RAM), a magnetic disk, or an optical disc.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In the absence of more restrictions, an element defined by the statement "including a . . . " does not exclude another same element in a process, method, article, or apparatus that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation manner. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations. The foregoing specific implementations are merely schematic instead of restrictive. Under enlightenment of the present disclosure, a person of ordinary skills in the art may make many forms without departing from the aims of the present disclosure and the protection scope of claims, all of which fall within the protection of the present disclosure.

What is claimed is:

1. A beam failure processing method, comprising:
determining, by a terminal based on a beam failure detection reference signal (BFD RS) resource group, whether a beam failure occurs in a first cell group, wherein the BFD RS resource group is configured in the first cell group; and
sending, by the terminal, a beam failure recovery request message to a network side device in a case that a beam failure occurs in the first cell group;
wherein the sending, by the terminal, a beam failure recovery request message to a network side device comprises:
sending, by the terminal, the beam failure recovery request message to the network side device in a first cell, wherein the first cell is a cell connected to the terminal;
wherein in a case that a primary cell and a secondary cell that are connected to the terminal are in a same frequency band,
the first cell comprises the secondary cell outside the first cell group or a second cell group in cells connected to the terminal and the first cell meets at least one of the following:
being the secondary cell associated with the first cell group or the second cell group; or
being the secondary cell indicated by a network side; or
being the secondary cell selected from a plurality of secondary cells configured by a network side; or
being the secondary cell in a same frequency band with the first cell group or the second cell group; or,
wherein in a case that the primary cell connected to the terminal is in a first frequency range and the secondary cell connected to the terminal is in a second frequency range, or the primary cell and the secondary cell that are connected to the terminal are in different frequency bands in the second frequency range,
wherein the first frequency range is less than the second frequency range; and
the first cell comprises any of the following:
the primary cell;
a cell in a same frequency band with the first cell group or the second cell group,
wherein the second cell group is a cell group configured with a candidate beam RS resource group;
the secondary cell in a frequency band in the second frequency range other than a frequency band in which the first cell group or the second cell group is located; and
a preset cell in a fourth cell group.

2. The method according to claim 1, wherein the first cell group comprises:
some or all secondary cells in a same frequency band; or
a primary cell and at least one secondary cell in a same frequency band.

3. The method according to claim 1, wherein the BFD RS resource group is configured in N preset cells in the first cell group, and N is a positive integer, wherein
the N preset cells are some cells in the first cell group, and each preset cell is a cell with a preset cell index; or
the N preset cells are all cells in the first cell group; or
the N preset cells are primary cells in a case that the first cell group comprises the primary cells.

4. The method according to claim 3, wherein in a case that the N preset cells are some or all the cells, and N is greater than 1, the determining, by the terminal, whether a beam failure occurs in a first cell group comprises:
in a case that a beam failure occurs in all cells in the N preset cells, determining, by the terminal, that a beam failure occurs in the first cell group; or
in a case that a beam failure occurs in a first quantity of cells in the N preset cells, determining, by the terminal, that a beam failure occurs in the first cell group.

5. The method according to claim 1, wherein before the sending, by the terminal, a beam failure recovery request message to a network side device, the method further comprises:
determining, by the terminal, a target candidate beam RS resource based on a candidate beam RS resource group, wherein
the beam failure recovery request message is used to indicate information about the target candidate beam RS resource, and the candidate beam RS resource group is configured in a second cell group.

6. The method according to claim 1,
wherein in a case that the primary cell and the secondary cell that are connected to the terminal are in the same frequency band, the first cell further comprises any one of the following:
the primary cell;
a preset cell in the first cell group or the second cell group, wherein a candidate beam RS resource group is configured in the second cell group; and
a preset cell in a third cell group.

7. The method according to claim 1, wherein the sending, by the terminal, a beam failure recovery request message to a network side device comprises:
sending, by the terminal, the beam failure recovery request message to the network side device in a second cell in a first manner, wherein
the second cell is a cell connected to the terminal.

8. The method according to claim 7, wherein the first manner comprises any one of the following:
sending, by the terminal, the beam failure recovery request message on a physical random access channel (PRACH) resource;
sending, by the terminal, the beam failure recovery request message on a physical uplink control channel (PUCCH) resource; and
sending, by the terminal, the beam failure recovery request message on a Medium Access Control (MAC) control element (CE).

9. The method according to claim 8, wherein in a case that the first manner is sending, by the terminal, the beam failure recovery request message on the PRACH resource, the PRACH resource is a contention-free PRACH resource and/or a contention PRACH resource; and
the sending, by the terminal, the beam failure recovery request message to the network side device in a second cell in a first manner comprises:
sending, by the terminal, the beam failure recovery request message on the contention-free PRACH resource; or
in a case that the beam failure recovery request message fails to be sent on the contention-free PRACH resource, sending, by the terminal, the beam failure recovery request message on the contention PRACH resource; or
in a case that a target candidate beam RS resource is not determined, sending, by the terminal, the beam failure recovery request message on the contention PRACH resource; or
in a case that the PRACH resource is only a contention PRACH resource, sending, by the terminal, the beam failure recovery request message on the contention PRACH resource.

10. The method according to claim 8, wherein in a case that a primary cell and a secondary cell that are connected to the terminal are in different frequency bands, the PRACH resource is a PRACH resource configured in a frequency band in which the first cell group is located.

11. The method according to claim 8, wherein in a case that the first manner is sending, by the terminal, the beam failure recovery request message on the PUCCH resource or sending, by the terminal, the beam failure recovery request message on the MAC CE, the beam failure recovery request message carries first information and/or second information, wherein the first information is used to indicate that a beam failure occurs in the first cell group, and the second information is used to indicate information about a candidate beam.

12. The method according to claim 1, wherein the sending, by the terminal, a beam failure recovery request message to a network side device comprises:

sending, by the terminal, the beam failure recovery request message to the network side device on a target uplink beam, wherein the target uplink beam is at least one uplink beam in a third cell, and the third cell is a cell connected to the terminal.

13. The method according to claim 12, wherein before the sending, by the terminal, the beam failure recovery request message to the network side device on a target uplink beam, the method further comprises:

determining, by the terminal, the target uplink beam based on a preset uplink beam, wherein the preset uplink beam comprises at least one of the following:

a beam of an uplink channel and/or an uplink reference signal last sent by the terminal;

a beam of a PUCCH last sent by the terminal; and a beam of a preset PUCCH in a preset cell and/or a preset bandwidth part (BWP), and the preset PUCCH has a preset PUCCH resource index.

14. The method according to claim 1, wherein after the sending, by the terminal, a beam failure recovery request message to a network side device, the method further comprises:

receiving, by the terminal, a beam failure recovery request response message sent by the network side device.

15. The method according to claim 14, wherein the receiving, by the terminal, a beam failure recovery request response message sent by the network side device comprises:

receiving, by the terminal in a fourth cell, the beam failure recovery request response message sent by the network side device, wherein the fourth cell comprises any one of the following:

a primary cell connected to the terminal; or a secondary cell in the first cell group, a second cell group, a third cell group, or a fourth cell group; and a secondary cell outside the first cell group, the second cell group, the third cell group, or the fourth cell group in cells connected to the terminal; or a preset cell in a fifth cell group, wherein the second cell group is configured with a candidate beam IRS resource group; the third cell group is a cell group in which a first cell is located in a case that a primary cell and a secondary cell that are connected to the terminal are in a same frequency band, and the first cell is a cell used to send the beam failure recovery request message; and the fourth cell group is a cell group in which the first cell is located in a case that the primary cell and the secondary cell are in different frequency bands.

16. A terminal device, comprising a processor, a memory, and a computer program that is stored in the memory and that can run on the processor, wherein when the processor executes the computer program, a beam failure processing method is implemented, and the method comprises:

determining, based on a beam failure detection reference signal (BFD RS) resource group, whether a beam failure occurs in a first cell group, wherein the BFD RS resource group is configured in the first cell group; and sending a beam failure recovery request message to a network side device in a case that a beam failure occurs in the first cell group;

wherein the sending, by the terminal, a beam failure recovery request message to a network side device comprises: sending, by the terminal, the beam failure recovery request message the network side device in a first cell, wherein the first cell is a cell connected to the terminal;

wherein in a case that a primary cell and a secondary cell that are connected to the terminal are in a same frequency band, the first cell comprises the secondary cell outside the first cell group or a second cell group in cells connected to the terminal and the first cell meets at least one of the following:

being the secondary cell associated with the first cell group or the second cell group; or being the secondary cell indicated by a network side; or being the secondary cell selected from a plurality of secondary cells configured by a network side; or being the secondary cell in a same frequency band with the first cell group or the second cell group; or, wherein in a case that the primary cell connected to the terminal is in a first frequency range and the secondary cell connected to the terminal is in a second frequency range, or the primary cell and the secondary cell that are connected to the terminal are in different frequency bands in the second frequency range, wherein the first frequency range is less than the second frequency range; and the first cell comprises any of the following:

the primary cell;

a cell in a same frequency band with the first cell group or the second cell group, wherein the second cell group is a cell group configured with a candidate beam RS resource group;

the secondary cell in a frequency band in the second frequency range other than a frequency band in which the first cell group or the second cell group is located; and a preset cell in a fourth cell group.

17. A network side device, comprising a processor, a memory, and a computer program that is stored in the memory and that can run on the processor, wherein when the processor executes the computer program, a beam failure processing method is implemented, and the method comprises:

receiving a beam failure recovery request message sent by a terminal, wherein the beam failure recovery request message is a message sent in a case that the terminal determines, based on a BFD RS resource group, that a beam failure occurs in a first cell group, and the BFD RS resource group is configured in the first cell group;

wherein the receiving a beam failure recovery request message sent by a terminal comprises:

receiving the beam failure recovery request message sent by the terminal in a first cell, wherein the first cell is a cell connected to the terminal;

wherein in a case that a primary cell and a secondary cell that are connected to the terminal are in a same frequency band, the first cell comprises the secondary cell outside the first cell group or a second cell group in cells connected to the terminal and the first cell meets at least one of the following:

being the secondary cell associated with the first cell group or the second cell group; or being the secondary cell indicated by a network side; or being the secondary cell selected from a plurality of secondary cells configured by a network side; or being the secondary cell in a same frequency band with the first cell group or the second cell group; or, wherein in a case that the primary cell connected to the terminal is in a first frequency range and the secondary cell connected to the terminal is in a second frequency range, or the primary cell and the secondary cell that are connected to the terminal are in different frequency bands in the second frequency range, wherein the first frequency range is less than the second frequency range; and the first cell comprises any of the following:

the primary cell;

a cell in a same frequency band with the first cell group or the second cell group, wherein the second cell group is a cell group configured with a candidate beam RS resource group;

the secondary cell in a frequency band in the second frequency range other than a frequency band in which the first cell group or the second cell group is located; and a preset cell in a fourth cell group.

* * * * *